United States Patent
Nakanishi

(10) Patent No.: US 8,748,858 B2
(45) Date of Patent: Jun. 10, 2014

(54) OPTICAL DETECTION DEVICE FOR DETECTING THE POSITION OF AN OBJECT BY USING EMISSION CURRENT CONTROL INFORMATION

(75) Inventor: Daisuke Nakanishi, Matsumoto (JP)

(73) Assignee: Seiko Epson Corporation (JP)

( * ) Notice: Subject to any disclaimer, the term of this patent is extended or adjusted under 35 U.S.C. 154(b) by 448 days.

(21) Appl. No.: 13/152,655

(22) Filed: Jun. 3, 2011

(65) Prior Publication Data

US 2011/0304859 A1 Dec. 15, 2011

(30) Foreign Application Priority Data

Jun. 11, 2010 (JP) ................................. 2010-133683

(51) Int. Cl.
*G01N 21/86* (2006.01)
*G01V 8/00* (2006.01)

(52) U.S. Cl.
USPC ................. 250/559.29; 250/559.36; 250/206; 356/614

(58) Field of Classification Search
USPC ............. 250/201.1, 206, 206.1, 206.2, 206.3; 345/159, 157, 158, 172, 173, 174, 175; 356/621, 51, 614, 622; 353/70, 31, 34, 353/38, 69, 85, 94, 97, 102, 121
See application file for complete search history.

(56) References Cited

U.S. PATENT DOCUMENTS

| | | | |
|---|---|---|---|
| 6,498,602 B1 * | 12/2002 | Ogawa | 345/173 |
| 6,512,507 B1 | 1/2003 | Furihata et al. | |
| 7,075,054 B2 * | 7/2006 | Iwamoto et al. | 250/221 |
| 7,864,341 B2 * | 1/2011 | Kobayashi | 356/614 |
| 2001/0055006 A1 * | 12/2001 | Sano et al. | 345/175 |
| 2004/0217267 A1 | 11/2004 | Reime | |
| 2005/0219229 A1 | 10/2005 | Yamaguchi | |
| 2011/0128554 A1 | 6/2011 | Nakanishi | |

FOREIGN PATENT DOCUMENTS

| | | |
|---|---|---|
| JP | 06-026321 | 6/1994 |
| JP | 11-345085 | 12/1999 |
| JP | 2001-142643 | 5/2001 |
| JP | 2004-535740 A | 11/2004 |
| JP | 2008-262569 A | 10/2008 |

* cited by examiner

*Primary Examiner* — Francis M Legasse, Jr.
(74) *Attorney, Agent, or Firm* — Harness, Dickey & Pierce, P.L.C.

(57) ABSTRACT

A processing device includes a control section adapted to perform emission control of first and second light source sections based on a light reception result of a light receiving section adapted to receive a reflected light beam caused by an object reflecting irradiation light beams from the first and second light source sections, and a determination section adapted to determine a positional relationship of the object with respect to the first and second light source sections based on emission current control information for performing the emission control. The determination section determines the positional relationship of the object based on first period emission current control information as the emission current control information in a first period in which no object exists in the detection area and second period emission current control information as the emission current control information in a second period in which the object exists in the detection area.

16 Claims, 13 Drawing Sheets

OPTICAL DETECTION DEVICE FOR DETECTING THE POSITION OF AN OBJECT BY USING EMISSION CURRENT CONTROL INFORMATION

BACKGROUND

1. Technical Field

The present invention relates to a processing device, an optical detection device, a display device, and so on.

2. Related Art

In the electronic devices such as a cellular phone a personal computer, a car navigation device, a ticket-vending machine, or a banking terminal, there is used in recent years a display device provided with a position detection function having a touch panel disposed on the front surface of the display section. According to the display device, it becomes possible for the user to point an icon or the like in a display image or input information while referring to the image displayed on the display section. As a position detection method using such a touch panel, there are known a resistive film type and a capacitance type, for example.

On the other hand, the display devices for projection display devices (projectors) and digital signage have a larger display area compared to the display devices for cellular phones and personal computers. Therefore, in these display devices, it is difficult to realize the position detection using the resistive touch panels and the capacitance touch panels described above.

Further, as the related art of the position detection device for the projection display devices, there are known the technologies disclosed in, for example, JP-A-11-345085 and JP-A-2001-142643. However, in the position detection devices, there arise the problems that the scale of the system becomes large and that the position detection is affected by the reflectance of the object.

SUMMARY

An advantage of some aspects of the invention is to provide a processing device, an optical detection device, a display device, an electronic apparatus, and so on capable of reducing, for example, the influence of the reflectance of the object to thereby perform the position detection with high accuracy.

An aspect of the invention relates to a processing device including a control section adapted to perform emission control of a first light source section and a second light source section based on a light reception result of a light receiving section adapted to receive a reflected light beam caused by an object reflecting irradiation light beams from the first light source section and the second light source section, and a determination section adapted to determine a positional relationship of the object with respect to the first light source section and the second light source section based on emission current control information for performing the emission control, wherein the determination section determines the positional relationship between the first and second light source sections and the object based on first period emission current control information as the emission current control information in a first period in which the object fails to exist in a detection area as an area where the object is detected and second period emission current control information as the emission current control information in a second period in which the object exists in the detection area.

According to this aspect of the invention, since the determination section can determine the positional relationship of the object based on the emission current control information in the first period and the emission current control information in the second period, it becomes possible to reduce the influence of the outside light (the environment light) such as the sunlight, the influence of the initial path of the irradiation light beam, and so on. As a result, improvement of the position detection accuracy becomes possible.

Further, according to the aspect of the invention, it is also possible that the light receiving section further receives an irradiation light beam from a reference light source section, the control section performs the emission control of the first light source section, the second light source section, and the reference light source section based on the light reception result in the light receiving section, and the determination section determines the positional relationship between the first and second light source sections and the object based on the first period emission current control information and the second period emission current control information for performing the emission control of the first light source section, the second light source section, and the reference light source section.

According to this configuration, since the determination section can determine the positional relationship of the object based on the emission current control information of not only the first and second light source sections but also the reference light source section, it becomes possible to reduce the influence of the reflectance varying between the objects. As a result, it becomes possible to, for example, improve the position detection accuracy without being affected by the reflectance of the object.

Further, according to the aspect of the invention, it is also possible that the control section performs, in the first period, the emission control of the first light source section and the reference light source section so that the light reception result of the light receiving section when the first light source section emits the light beam and the light reception result of the light receiving section when the reference light source section emits the light beam become equal to each other, and the emission control of the second light source section and the reference light source section so that the light reception result of the light receiving section when the second light source section emits the light beam and the light reception result of the light receiving section when the reference light source section emits the light beam become equal to each other, and the control section performs, in the second period, the emission control of the first light source section and the reference light source section so that the light reception result of the light receiving section when the first light source section emits the light beam and the light reception result of the light receiving section when the reference light source section emits the light beam become equal to each other, and the emission control of the second light source section and the reference light source section so that the light reception result of the light receiving section when the second light source section emits the light beam and the light reception result of the light receiving section when the reference light source section emits the light beam become equal to each other.

According to this configuration, since it is possible for the control section to compare the light reception result when the first light source section emits the light beam and the light reception result when the reference light source section emits the light beam with each other to thereby perform the emission control so that the both results become equal to each other, it becomes possible to perform the stable emission control using, for example, a comparator circuit.

Further, according to the aspect of the invention, it is also possible that the control section outputs, in the first period, primary first period emission current control information for setting currents respectively flow through the first light source section and the reference light source section to the determination section so that the light reception result of the light receiving section when the first light source section emits the light beam and the light reception result of the light receiving section when the reference light source section emits the light beam become equal to each other, and secondary first period emission current control information for setting currents respectively flow through the second light source section and the reference light source section to the determination section so that the light reception result of the light receiving section when the second light source section emits the light beam and the light reception result of the light receiving section when the reference light source section emits the light beam become equal to each other, and the control section outputs, in the second period, primary second period emission current control information for setting currents respectively flow through the first light source section and the reference light source section to the determination section so that the light reception result of the light receiving section when the first light source section emits the light beam and the light reception result of the light receiving section when the reference light source section emits the light beam become equal to each other, and secondary second period emission current control information for setting currents respectively flow through the second light source section and the reference light source section to the determination section so that the light reception result of the light receiving section when the second light source section emits the light beam and the light reception result of the light receiving section when the reference light source section emits the light beam become equal to each other, and the determination section determines the positional relationship of the object with respect to the first light source section and the second light source section based on the primary first period emission current control information, the secondary first period emission current control information, the primary second period emission current control information, and secondary second period emission current control information.

According to this configuration, since the determination section can determine the positional relationship of the object based on the primary and secondary first period emission current control information and the primary and secondary second period emission current control information, it becomes possible to reduce the influence of the outside light (the environment light) such as the sunlight, the influence of the initial path of the irradiation light beam, the influence of the reflectance varying between the objects, and so on. As a result, it becomes possible to improve the position detection accuracy and to detect the objects with the reflectance different from each other.

Further, according to the aspect of the invention, it is also possible that, assuming that current setting values of the currents respectively flowing through the first light source section and the reference light source section, which correspond to the primary first period emission current control information, are IA1 and IB1, current setting values of the currents respectively flowing through the second light source section and the reference light source section, which correspond to the secondary first period emission current control information, are IA2 and IB2, current setting values of the currents respectively flowing through the first light source section and the reference light source section, which correspond to the primary second period emission current control information, are IA1$d$ and IB1$d$, current setting values of the currents respectively flowing through the second light source section and the reference light source section, which correspond to the secondary second period emission current control information, are IA2$d$ and IB2$d$, a value of a first function representing the positional relationship of the object with respect to the first light source section is FA1, a value of a second function representing the positional relationship of the object with respect to the second light source section is FA2, and a ratio between the value FA1 of the first function and the value FA2 of the second function is FR, the determination section determines the positional relationship of the object with respect to the first light source section and the second light source section by obtaining the ratio FR between the value FA1 of the first function and the value FA2 of the second function using the following relational expression.

$$FR=(IB2 \times IA1 \times IB1d/IA1d - IB1 \times IB2)/(IB1 \times IA2 \times IB2d/IA2d - IB1 \times IB2)$$

According to this configuration, since the determination section can determine the positional relationship of the object with respect to the first and second light source sections based on the current setting values of the respective light source sections as the emission current control information.

Further, according to the aspect of the invention, it is also possible that the control section performs, in the first period, the emission control of the first light source section and the second light source section so that the light reception result of the light receiving section when the first light source section emits the light beam and the light reception result of the light receiving section when the second light source section emits the light beam become equal to each other, and the control section performs, in the second period, the emission control of the first light source section and the second light source section so that the light reception result of the light receiving section when the first light source section emits the light beam and the light reception result of the light receiving section when the second light source section emits the light beam become equal to each other.

According to this configuration, since the control section can perform the emission control without using the reference light source section, it becomes possible to perform the efficient position detection with a simple configuration.

Further, according to the aspect of the invention, it is also possible that the control section outputs, in the first period, the first period emission current control information for setting currents respectively flow through the first light source section and the second light source section to the determination section so that the light reception result of the light receiving section when the first light source section emits the light beam and the light reception result of the light receiving section when the second light source section emits the light beam become equal to each other, and the control section outputs, in the second period, the second period emission current control information for setting currents respectively flow through the first light source section and the second light source section to the determination section so that the light reception result of the light receiving section when the first light source section emits the light beam and the light reception result of the light receiving section when the second light source section emits the light beam become equal to each other, and the determination section determines the positional relationship of the object with respect to the first light source section and the second light source section based on the first period emission current control information and the second period emission current control information.

According to this configuration, since it is possible for the control section to compare the light reception result when the first light source section emits the light beam and the light reception result when the second light source section emits the light beam with each other to thereby perform the emission control so that the both results become equal to each other, it becomes possible to perform the stable emission control using, for example, a comparator circuit.

Further, according to the aspect of the invention, it is also possible that, assuming that current setting values of the currents respectively flowing through the first light source section and the second light source section, which correspond to the first period emission current control information, are IA1 and IA2, current setting values of the currents respectively flowing through the first light source section and the second light source section, which correspond to the second period emission current control information, are IA1$d$ and IA2$d$, a value of a first function representing the positional relationship of the object with respect to the first light source section is FA1, a value of a second function representing the positional relationship of the object with respect to the second light source section is FA2, and a ratio between the value FA1 of the first function and the value FA2 of the second function is FR, the determination section determines the positional relationship of the object with respect to the first light source section and the second light source section by obtaining the ratio FR between the value FA1 of the first function and the value FA2 of the second function using the following relational expression.

$$FR=(IA1\times IA2d)/(IA2\times IA1d)$$

According to this configuration, since the determination section can determine the positional relationship of the object with respect to the first and second light source sections based on the current setting values of the respective light source sections as the emission current control information.

Another aspect of the invention relates to an optical detection device including any one of the processing devices described above.

Further, according to this aspect of the invention, it is possible to include an irradiation section including the first light source section and the second light source section, and the light receiving section adapted to receive the reflected light beam caused by the object reflecting the irradiation light beam from the irradiation section.

According to this configuration, it is possible that the control section performs the emission control based on the light reception result of the light receiving section adapted to receive the reflected light caused by the object reflecting the irradiation light beams from the first and second light source sections of the irradiation section, and the determination section determines the positional relationship of the object based on the emission current control information.

Further, according to this aspect of the invention, it is possible that the irradiation section includes a light guide having a curved shape and adapted to guide a first source light beam from the first light source section and a second source light beam from the second light source section along a curved light guide path, and an irradiation direction setting section adapted to receive the first source light beam and the second source light beam emitted from an outer circumferential side of the light guide and set the irradiation direction of the irradiation light beam to a direction from an inner circumferential side toward the outer circumferential side of the light guide having the curved shape.

According to this configuration, since it is possible to form two irradiation light intensity distributions by making the first and second light source sections alternately emit light beams, it becomes possible to reduce the influence of the outside light such as the sunlight to thereby improve the position detection accuracy.

Still another aspect of the invention relates to a display device and an electronic apparatus including any one of the optical detection devices described above.

BRIEF DESCRIPTION OF THE DRAWINGS

The invention will be described with reference to the accompanying drawings, wherein like numbers reference like elements.

DESCRIPTION OF AN EXEMPLARY EMBODIMENT

Hereinafter, a preferred embodiment of the invention will be described in detail. It should be noted that the present embodiment explained below does not unreasonably limit the content of the invention as set forth in the appended claims, and all of the constituents set forth in the present embodiment are not necessarily essential as means of the invention for solving the problems.

1. Optical Detection Device and Processing Device

Figure 1A:
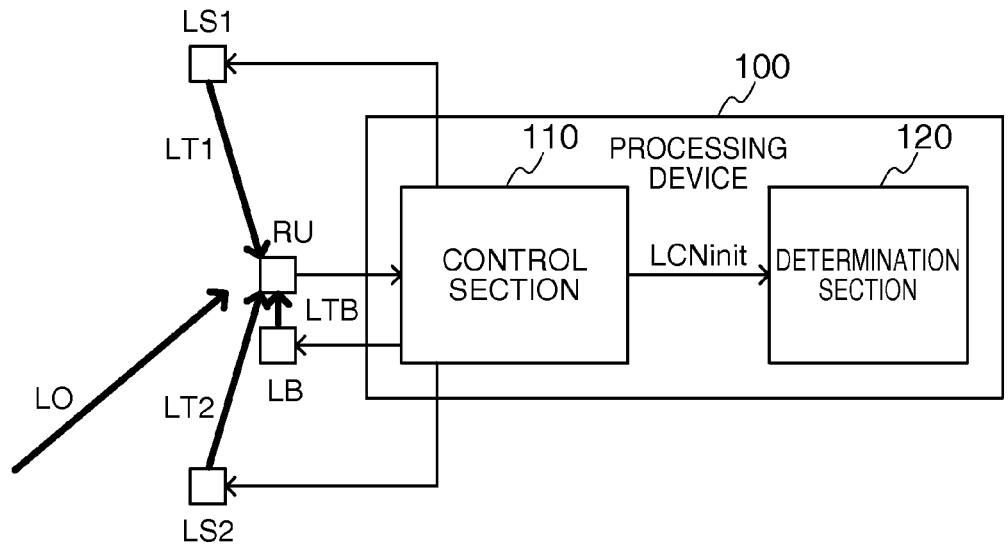
FIGS. 1A and 1B are diagrams showing a basic configuration example of an optical detection device and a processing device.
Figure 1B:
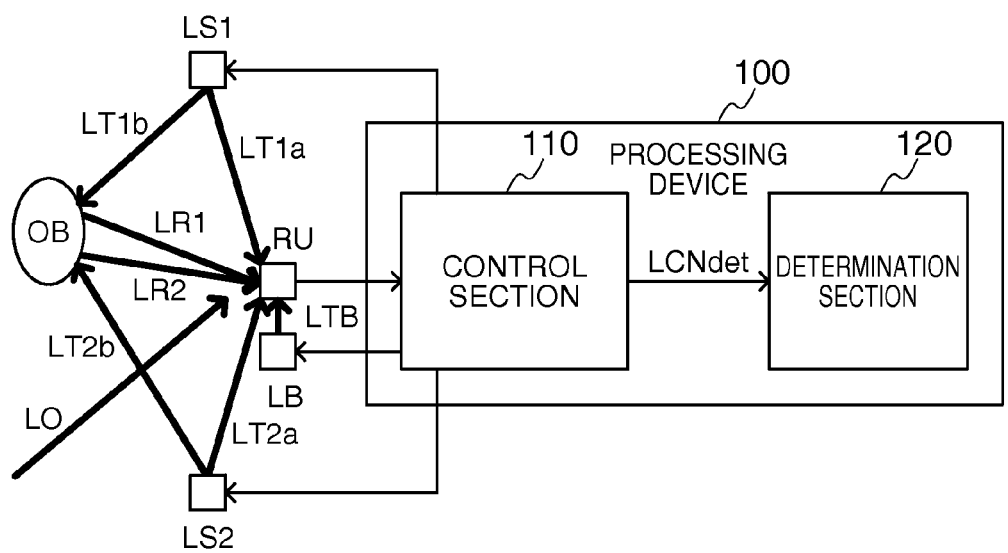

FIGS. 1A and 1B are diagrams showing a basic configuration example of an optical detection device and a processing device 100 according to the present embodiment. The optical detection device according to the present embodiment includes the processing device 100, first and second light source sections LS1, LS2, a reference light source section LB, and a light receiving section RU. Further, the processing device 100 according to the present embodiment includes a control section 110 and a determination section 120. It should be noted that the optical detection device and the processing device 100 according to the present embodiment are not limited to the configurations shown in FIGS. 1A and 1B, and can be put into practice in variously modified forms such as elimination of some of the constituents, replacement with other constituents, or addition of other constituents. For example, a third light source section and further a fourth light source section can also be provided as the light source sections. Further, the configuration without the reference light source section LB can also be adopted.

The control section 110 performs the emission control of the first and second light source sections LS1, LS2 based on the reception result of the light receiving section RU for at least receiving the reflected light beams LR1, LR2 generated by the object OB reflecting the irradiation light beams LT1, LT2 emitted from the first and second light source sections LS1, LS2. Further, the light receiving section RU further receives the irradiation light LTB from the reference light source section LB, and the control section 110 performs the emission control of the first and second light source sections LS1, LS2 and the reference light source section LB based on the reception result in the light receiving section RU.

The first and second light source sections LS1, LS2 are light sources for emitting the irradiation light beams LT1, LT2, and are provided with a light emitting element such as a light emitting diode (LED). The first and second light source sections LS1, LS2 emit an infrared light beam (a near infrared light beam near to the visible light range).

The reference light source section LB is disposed so that the irradiation light beam LTB from the reference light source section LB is not reflected by the object OB. In other words, the reference light source section LB is a light source disposed so as not to emit the irradiation light beam LTB in the detection area. The reference light source section LB also includes the light emitting element such as a light emitting diode (LED) similarly to the light source sections LS1, LS2, and emits an infrared light beam (the near infrared light beam near to the visible light range), for example.

The determination section 120 determines the positional relationship of the object OB with respect to the first and second light source sections LS1, LS2 based on the emission current control information LCN for performing the emission control of the first and second light source sections LS1, LS2 and the reference light source section LB.

Specifically, the determination section 120 determines the positional relationship between the first and second light source sections LS1, LS2 and the object OB based on the first period emission current control information LCNinit and the second period emission current control information LCNdet. The first period emission current control information LCNinit is the emission current control information in the first period (an initial state period) in which the object OB does not exist in the detection area, and the second period emission current control information LCNdet is the emission current control information in the second period (a detection period) in which the object OB exists in the detection area. The method of determining the positional relationship using the emission current control information will be described later.

The detection area is an area where the object is detected, and is specifically the area in which the light receiving section RU can receive the reflected light beams LR1, LR2 obtained by the object OB reflecting, for example, the irradiation light beams LT1, LT2 to thereby detect the object OB. More specifically, the detection area is the area where the light receiving section RU can receive the reflected light beams LR1, LR2 to thereby detect the object OB, and the detection accuracy within the allowable range can be assured.

The positional relationship of the object OB with respect to the first and second light source sections LS1, LS2 is, for example, the distance from the light source section LS1 (or LS2) to the object OB, or a direction (e.g., the angle from the direction to be a reference such as the X-axis) of the object OB viewed from the reference point defined by the positions of the light source sections LS1, LS2. It becomes possible to identify the position of the object OB based on these positional relationships.

It should be noted that the processing device 100 including the control section 110 and the determination section 120 can be realized by an integrated circuit device including, for example, an analog circuit and a logic circuit, and it is possible to perform the control using, for example, the software operating on a microcomputer.

FIG. 1A shows the operation in the first period in which the object OB does not exist in the detection area. Firstly, the control section 110 makes the first light source section LS1 and the reference light source section LB emit light beams alternately. The light receiving section RU receives the irradiation light beam LT1 from the first light source section LS1 when the first light source section LS1 emits the light beam, and receives the irradiation light beam LTB from the reference light source section LB when the reference light source section LB emits the light beam. Further, the light receiving section RU receives the outside light (environment light) LO such as the sunlight.

The control section 110 performs the emission control (the emission current control) of the first light source section LS1 and the reference light source section LB so that the light reception result during the first light source section LS1 is emitting the light beam and the light reception result during the reference light source section LB is emitting the light beam become equal to each other. Subsequently, the control section 110 makes the second light source section LS2 and the reference light source section LB emit light beams alternately.

The light receiving section RU receives the irradiation light beam LT2 from the second light source section LS2 when the second light source section LS2 emits the light beam, and receives the irradiation light beam LTB from the reference light source section LB when the reference light source section LB emits the light beam. Further, the light receiving section RU receives the outside light (environment light) LO such as the sunlight.

The control section 110 performs the emission control (the emission current control) of the second light source section LS2 and the reference light source section LB so that the light reception result during the second light source section LS2 is emitting the light beam and the light reception result during the reference light source section LB is emitting the light beam become equal to each other. Further, the control section 110 outputs the emission current control information obtained by the emission control described above to the determination section 120 as the first period emission current control information LCNinit. By thus performing the emission control in the first period, it becomes possible to eliminate the influence of the initial paths (the light paths in the case in which no object exists) of the irradiation light beams LT1, LT2.

FIG. 1B shows the operation in the second period in which the object OB exists in the detection area. Firstly, the control section 110 makes the first light source section LS1 and the reference light source section LB emit light beams alternately. The light receiving section RU receives the irradiation light beam LT1a from the first light source section LS1 and the reflected light beam LR1 caused by the object OB reflecting the irradiation light beam LT1b during the first light source section LS1 is emitting the light beam, and receives the irradiation light beam LTB from the reference light source section LB during the reference light source section LB is emitting the light beam. Further, the light receiving section RU receives the outside light (environment light) LO such as the sunlight. The control section 110 performs the emission control (the emission current control) of the first light source section LS1 and the reference light source section LB so that the light reception result during the first light source section LS1 is emitting the light beam and the light reception result during the reference light source section LB is emitting the light beam become equal to each other.

Subsequently, the control section 110 makes the second light source section LS2 and the reference light source section LB emit light beams alternately. The light receiving section RU receives the irradiation light beam LT2a from the second light source section LS2 and the reflected light beam LR2 caused by the object OB reflecting the irradiation light beam LT2b during the second light source section LS2 is emitting the light beam, and receives the irradiation light beam LTB from the reference light source section LB during the reference light source section LB is emitting the light beam. Further, the light receiving section RU receives the outside light (environment light) LO such as the sunlight. The control section 110 performs the emission control (the emission current control) of the second light source section LS2 and the reference light source section LB so that the light reception result during the second light source section LS2 is emitting the light beam and the light reception result during the reference light source section LB is emitting the light beam become equal to each other. Further, the control section 110 outputs the emission current control information obtained by the emission control described above to the determination section 120 as the second period emission current control information LCNdet.

Figure 2A:
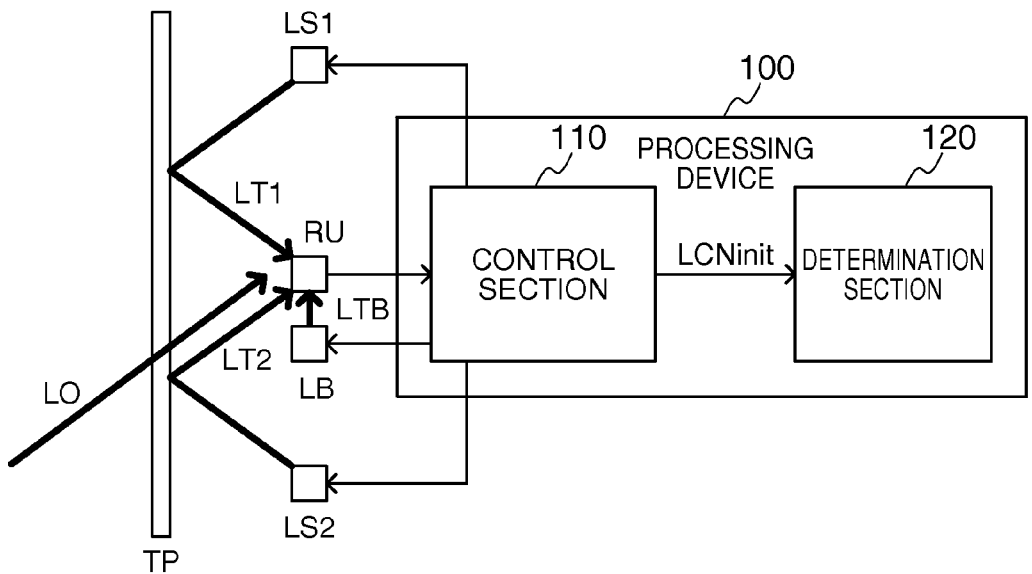
FIGS. 2A and 2B are diagrams showing a modified example of the basic configuration example of the optical detection device and the processing device.
Figure 2B:
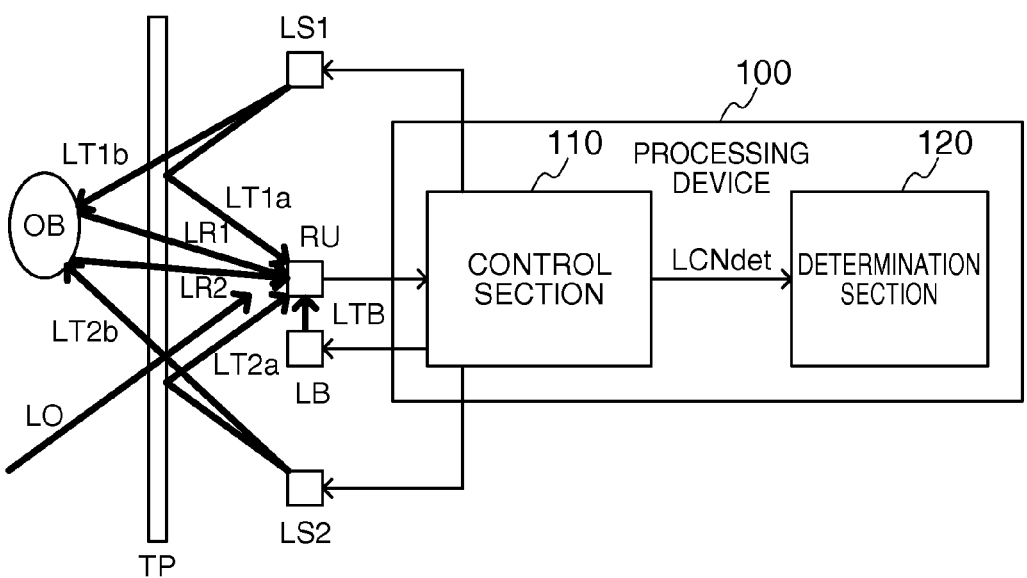

FIGS. 2A and 2B are diagrams showing a modified example of the basic configuration example of the processing device 100 and the optical detection device according to the present embodiment. The modified example is obtained by further adding a light transmissive member TP to the configuration shown in FIGS. 1A and 1B described above. The light transmissive member TP is disposed between the object OB and other elements consisting of the first and second light source sections LS1, LS2, the reference light source section LB, and the light receiving section RU.

As shown in FIG. 2A, in the first period the light receiving section RU receives the irradiation light beams LT1, LT2 reflected by the light transmissive member TP instead of the direct light beams from the first and second light source sections LS1, LS2. Further, as shown in FIG. 2B, in the second period, the light receiving section RU receives the irradiation light beam LT1a reflected by the light transmissive member TP and the reflected light beam LR1, which is the irradiation light beam LT1b transmitted through the light transmissive member TP, reflected by the object OB, and then further transmitted through the light transmissive member TP, during the first light source section LS1 is emitting the light beam. Similarly, the light receiving section RU receives the irradiation light beam LT2a reflected by the light transmissive member TP and the reflected light beam LR2, which is the irradiation light beam LT2b transmitted through the light transmissive member TP, reflected by the object OB, and then further transmitted through the light transmissive member TP, during the second light source section LS2 is emitting the light beam. It should be noted that the irradiation light beam LTB from the reference light source section LB is never affected by disposing the light transmissive member TP. Further, the emission control by the control section 110 is the same as the control explained with reference to FIGS. 1A and 1B.

As described above, according to the optical detection device and the processing device 100 of the present embodiment, the positional relationship between the light source sections and the object can be determined based on the emission current control information in the period in which no object exists in the detection area, namely the first period, and the emission current control information in the period in which the object exists in the detection area, namely the second period. In such a manner as described above, the influence of the outside light (the environment light) such as the sunlight, the influence of the initial path, and the influence of the reflectance different between the objects can be reduced. As a result, it becomes possible to improve the position detection accuracy and to detect various types of objects with the reflectance different from each other.

2. Emission Control by Control Section

Figure 3:
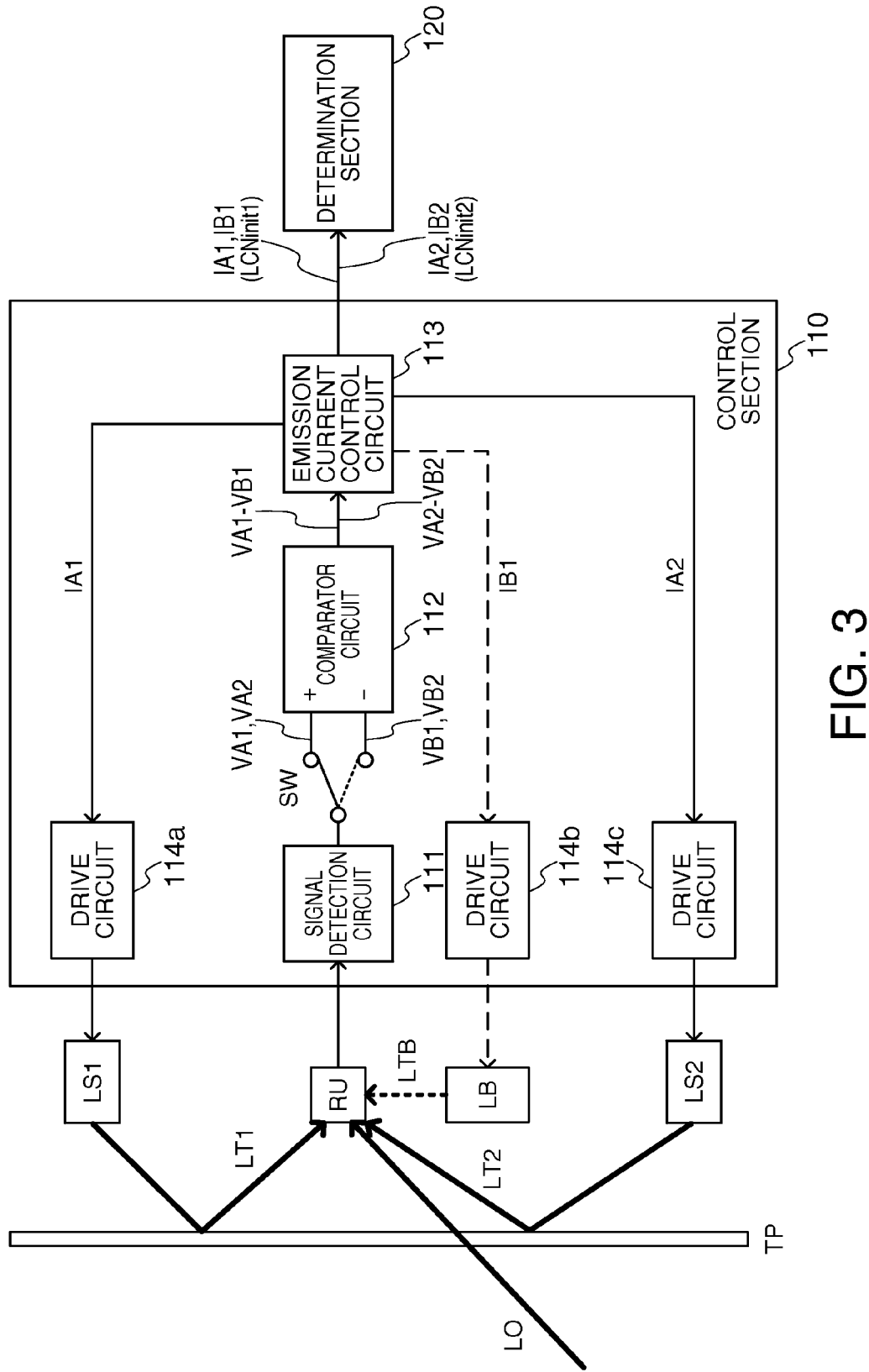
FIG. 3 is a diagram for explaining a configuration example of a control section and the emission control in a first period.

FIG. 3 shows a configuration example of the control section 110 according to the present embodiment and the emission control in the first period. The control section 110 includes a signal detection circuit 111, a switch circuit SW, a comparator circuit 112, an emission current control circuit 113, and drive circuits 114a through 114c. It should be noted that the control section 110 of the present embodiment is not limited to the configuration shown in FIG. 3, and can be put into practice in variously modified forms such as elimination of some of the constituents, replacement with other constituents, or addition of other constituents.

The signal detection circuit 111 converts the light reception detection current from the light receiving section RU into a voltage, and amplifies and then outputs the voltage to the switch circuit SW. The switch circuit SW outputs the light reception detection signal from the signal detection circuit 111 to either of one input node (+) and the other input node (−) of the comparator circuit 112 while switching between the input nodes. Specifically, the light reception detection signal is output to the input node (+) during the first and second light source sections LS1, LS2 are emitting the light beams, and the light reception detection signal is output to the input node (−) during the reference light source section LB is emitting the light beam.

The comparator circuit 112 compares the light reception detection signal input to the input node (+) and the light reception detection signal input to the input node (−) with each other, and outputs the result to the emission current control circuit 113. Specifically, when the light reception detection signal VA1 during the first light source section LS1 is emitting the light beam, for example, is input to the input node (+), and the light reception detection signal VB1 during the reference light source section LB is emitting the light beam is input to the input node (−), the comparator circuit 112 outputs the signal corresponding to the difference VA1−VB1 between the two light reception detection signals.

The emission current control circuit 113 performs the emission control of the first and second light source sections LS1, LS2 and the reference light source section LB based on the signal from the comparator circuit 112. Specifically, the emission current control circuit 113 outputs the emission current control information LCN for setting the currents (the emission currents) flowing through the two light source sections (e.g., the first light source section LS1 and the reference light source section LB) so that the two light reception detection signals (e.g., the light reception detection signals VA1, VB1) based on the comparison result (the difference between the light reception detection signals) of the comparator circuit 112. The emission current control information LCN includes, for example, the current setting value IA1 for setting the emission current of the first light source section LS1 and the current setting value IB1 for setting the emission current of the reference light source section LB.

The drive circuits 114a through 114c generate the emission currents based on the current setting values IA1, IB1, IA2, and IB2 from the emission current control circuit 113 and supply the emission currents to the first light source section LS1, the reference light source section LB and the second light source section LS2.

The emission control in the first period will be explained with reference to FIG. 3. Although FIG. 3 shows the configuration example including the light transmissive member TP, the same can be applied to the configuration without including the light transmissive member TP. The control section 110 firstly makes the first light source section LS1 and the reference light source section LB emit light beams alternately, and performs the emission control so that the light reception result during the first light source section LS1 is emitting the light beam and the light reception result during the reference light source section LB is emitting the light beam become equal to each other. Specifically, the control section 110 sets the current setting values IA1, IB1 of the emission currents of the first light source section LS1 and the reference light source section LB so that the difference approximates to zero based on the comparison result (the difference between the light reception detection signals) of the comparator circuit 112. Further, the control section 110 outputs the current setting values IA1, IB1 in the case in which the two light reception results become equal to each other to the determination section 120 as the primary first period emission current control information LCNinit1.

Subsequently, the control section 110 makes the second light source section LS2 and the reference light source section LB emit light beams alternately, and performs the emission control so that the light reception result during the second light source section LS2 is emitting the light beam and the light reception result during the reference light source section LB is emitting the light beam become equal to each other. Specifically, the control section 110 sets the current setting values IA2, IB2 of the emission currents of the second light source section LS2 and the reference light source section LB so that the difference approximates to zero based on the comparison result (the difference between the light reception detection signals) of the comparator circuit 112. Further, the control section 110 outputs the current setting values IA2, IB2 in the case in which the two light reception results become equal to each other to the determination section 120 as the secondary first period emission current control information LCNinit2.

Figure 4:
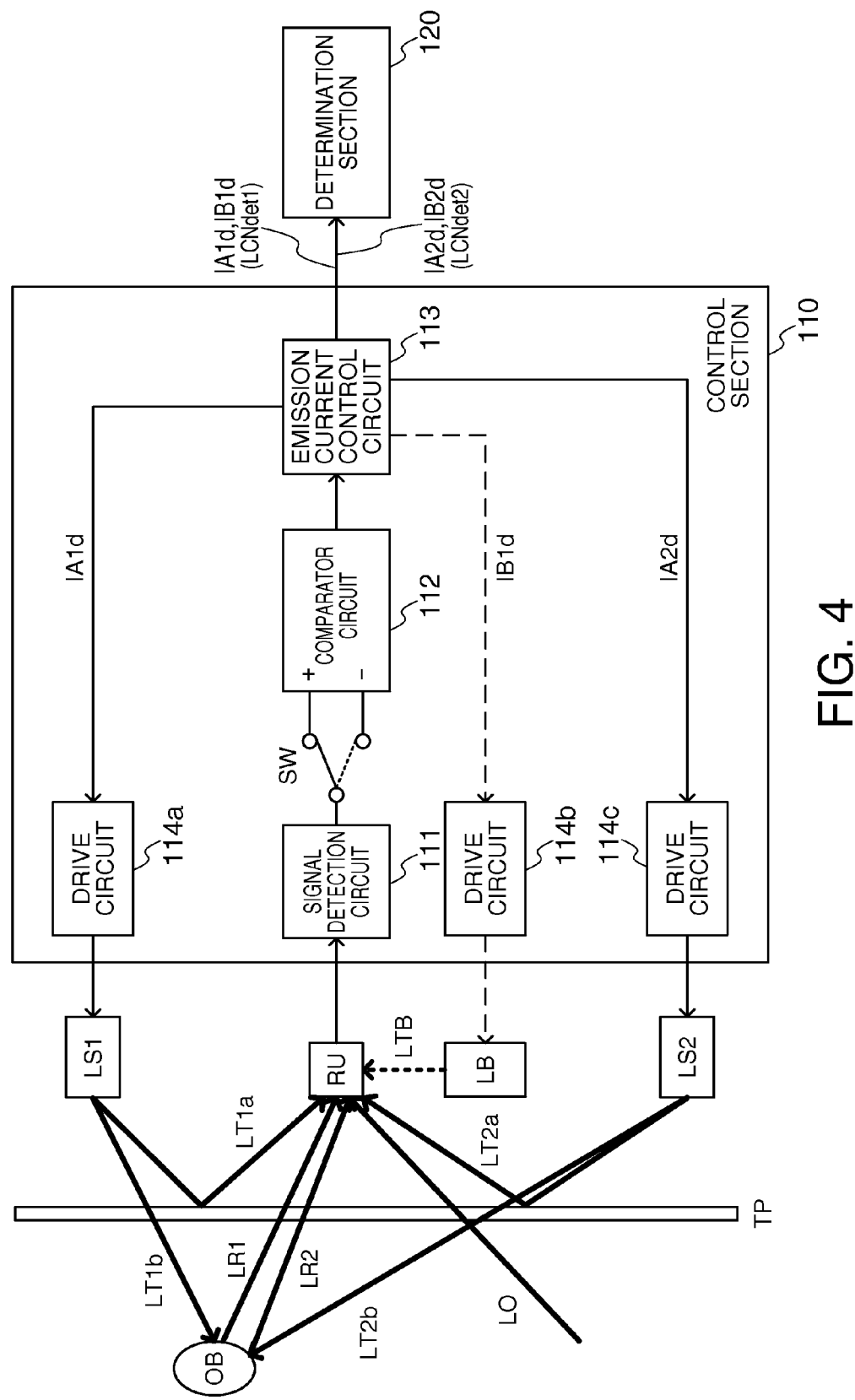
FIG. 4 is a diagram for explaining the emission control by the control section in a second period.

FIG. 4 is a diagram for explaining the emission control by the control section 110 in the second period. Although FIG. 4 shows the configuration example including the light transmissive member TP, the same can be applied to the configuration without including the light transmissive member TP. The emission control in the second period is the same as the emission control in the first period described above. Therefore, the control section 110 firstly makes the first light source section LS1 and the reference light source section LB emit light beams alternately, and performs the emission control so that the light reception result during the first light source section LS1 is emitting the light beam and the light reception result during the reference light source section LB is emitting the light beam become equal to each other. Specifically, the control section 110 sets the current setting values IA1d, IB1d of the emission currents of the first light source section LS1 and the reference light source section LB so that the difference approximates to zero based on the comparison result (the difference between the light reception detection signals) of the comparator circuit 112. Then, the control section 110 outputs the current setting values IA1d, IB1d in the case in which the two light reception results become equal to each other to the determination section 120 as the primary second period emission current control information LCNdet1.

Subsequently, the control section 110 makes the second light source section LS2 and the reference light source section LB emit light beams alternately, and performs the emission control so that the light reception result during the second light source section LS2 is emitting the light beam and the light reception result during the reference light source section LB is emitting the light beam become equal to each other. Specifically, the control section 110 sets the current setting values IA2d, IB2d of the emission currents of the second light source section LS2 and the reference light source section LB so that the difference approximates to zero based on the comparison result (the difference between the light reception detection signals) of the comparator circuit 112. Then, the control section 110 outputs the current setting values IA2d, IB2d in the case in which the two light reception results become equal to each other to the determination section 120 as the secondary second period emission current control information LCNdet2.

The determination section 120 determines the positional relationship of the object OB with respect to the first and second light source sections LS1, LS2 based on the primary and secondary first period emission current control information LCNinit1, LCNinit2, the primary and secondary second period emission current control information LCNdet1, LCNdet2 output from the control section 110. It should be noted that the method of determining the positional relationship using the emission current control information described above will be described later.

Figure 5:
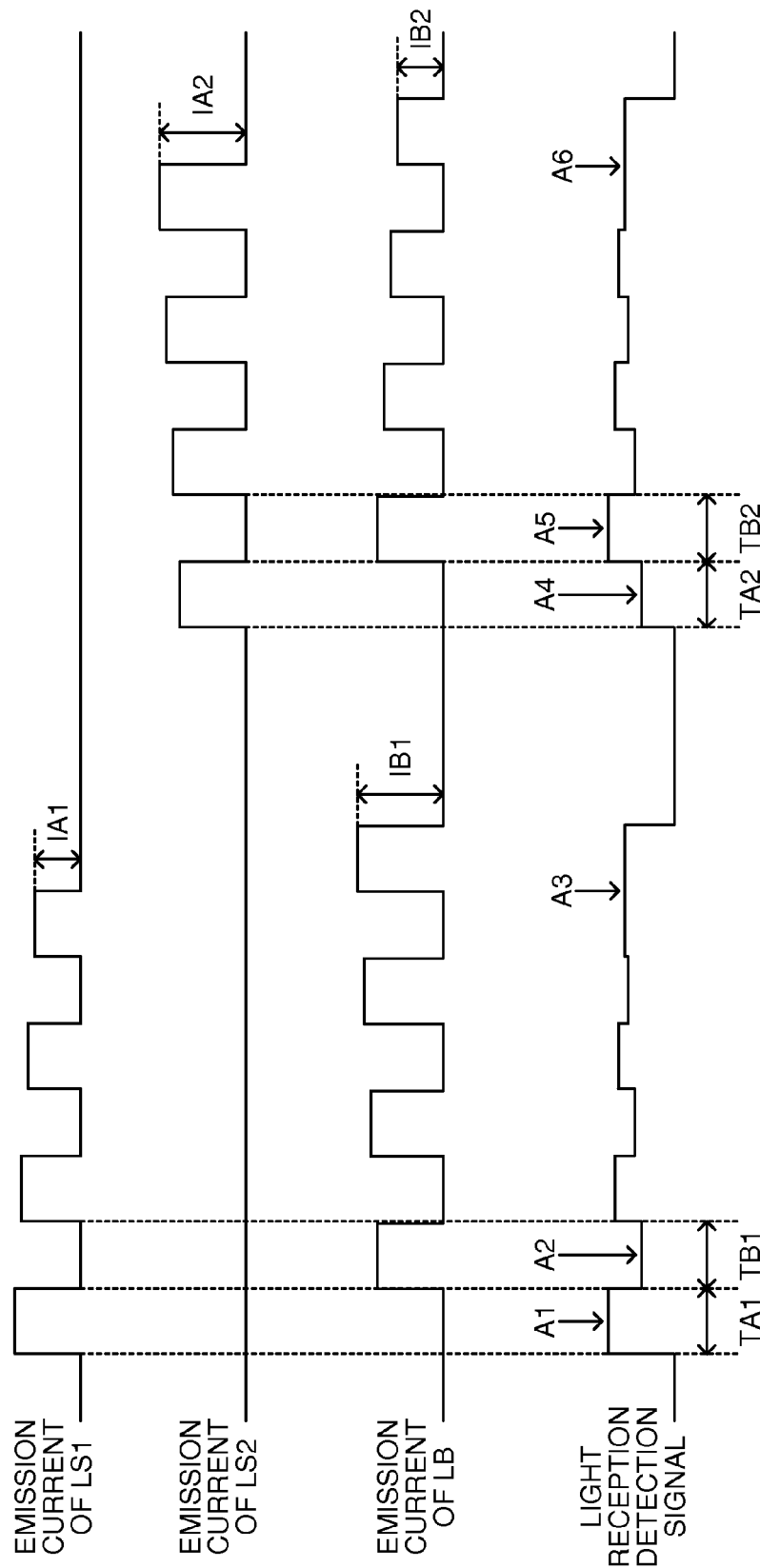
FIG. 5 is a diagram showing an example of the waveforms of the emission current and the reception detection signal.

FIG. 5 shows an example of the waveform of the emission currents of the first and second light source sections LS1, LS2, and the reference light source section LB, and the light reception detection signal output by the signal detection circuit 111 due to the emission control (FIGS. 3 and 4) described above. The emission period TA1 for the first light source section LS1 and the emission period TB1 for the reference light source section LB are provided alternately. In the emission period TA1, the emission current flows through the first light source section LS1 to thereby make the first light source section LS1 emit the light beam, and the light reception detection signal VA1 corresponding to the light reception result of the light receiving section RU is output (A1 in FIG. 5). Further, in the emission period TB1, the emission current flows through the reference light source section LB to thereby make the reference light source section LB emit the light beam, and the light reception detection signal VB1 corresponding to the light reception result of the light receiving section RU is output (A2 in FIG. 5).

Then, the emission currents are controlled so that the difference VA1−VB1 in the light reception detection signal approximates to zero. For example, since VA1>VB1 is shown in FIG. 5, the control of reducing the emission current of the first light source section LS1 and increasing the emission current of the reference light source section LB is performed. Further, if the light reception detection signal VA1 and the light reception detection signal VB1 become approximately equal to each other (A3 in FIG. 5), the current setting values IA1, IB1 on this occasion are output to the determination section 120 as the primary first period emission current control information LCNinit1.

Subsequently, the emission period TA2 for the second light source section LS2 and the emission period TB2 for the reference light source section LB are provided alternately. In the emission period TA2, the emission current flows through the second light source section LS2 to thereby make the second light source section LS2 emit the light beam, and the light reception detection signal VA2 corresponding to the light reception result of the light receiving section RU is output (A4 in FIG. 5). Further, in the emission period TB2, the emission current flows through the reference light source section LB to thereby make the reference light source section LB emit the light beam, and the light reception detection signal VB2 corresponding to the light reception result of the light receiving section RU is output (A5 in FIG. 5).

Then, the emission currents are controlled so that the difference VA2−VB2 in the light reception detection signal approximates to zero. For example, since VA2<VB2 is shown in FIG. 5, the control of increasing the emission current of the second light source section LS2 and reducing the emission current of the reference light source section LB is performed. Then, if the light reception detection signal VA2 and the light reception detection signal VB2 become approximately equal to each other (A6 in FIG. 5), the current setting values IA2, IB2 on this occasion are output to the determination section 120 as the secondary first period emission current control information LCNinit2.

The emission control in the first period is explained hereinabove. The same can also be applied to the emission control in the second period. Specifically, the first light source section LS1 and the reference light source section LB are made to emit light beams alternately, and the emission currents are controlled so that the difference VA1−VB1 in the light reception detection signal approximates to zero. Further, if the light reception detection signal VA1 and the light reception detection signal VB1 become approximately equal to each other, the current setting values IA1d, IB1d on this occasion are output to the determination section 120 as the primary second period emission current control information LCNdet1. Then, the second light source section LS2 and the reference light source section LB are made to emit light beams alternately, and the emission currents are controlled so that the difference VA2−VB2 in the light reception detection signal approximates to zero. Then, if the light reception detection signal VA2 and the light reception detection signal VB2 become approximately equal to each other, the current setting values IA2d, IB2d on this occasion are output to the determination section 120 as the secondary second period emission current control information LCNdet2.

Figure 6:
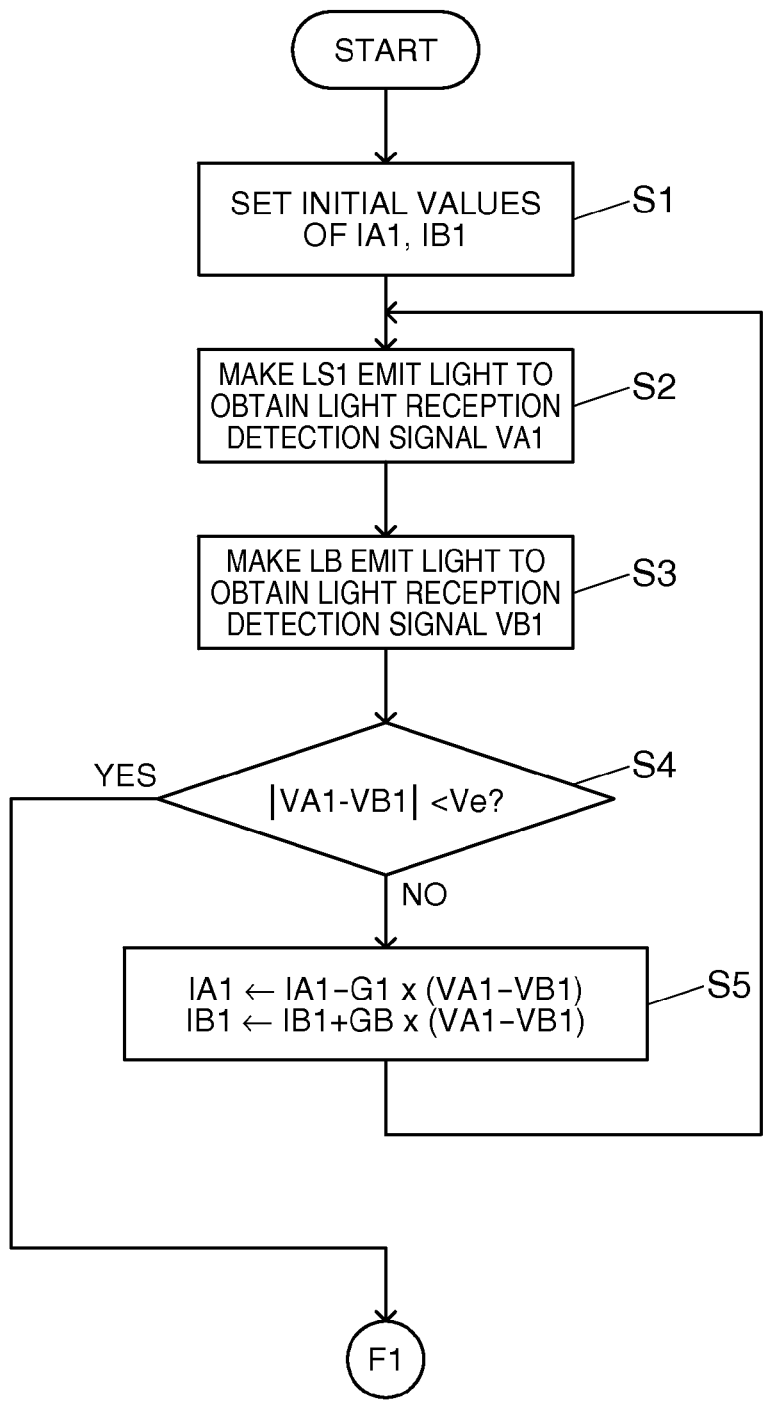
FIG. 6 is an example of the flowchart of the emission control.
Figure 7:
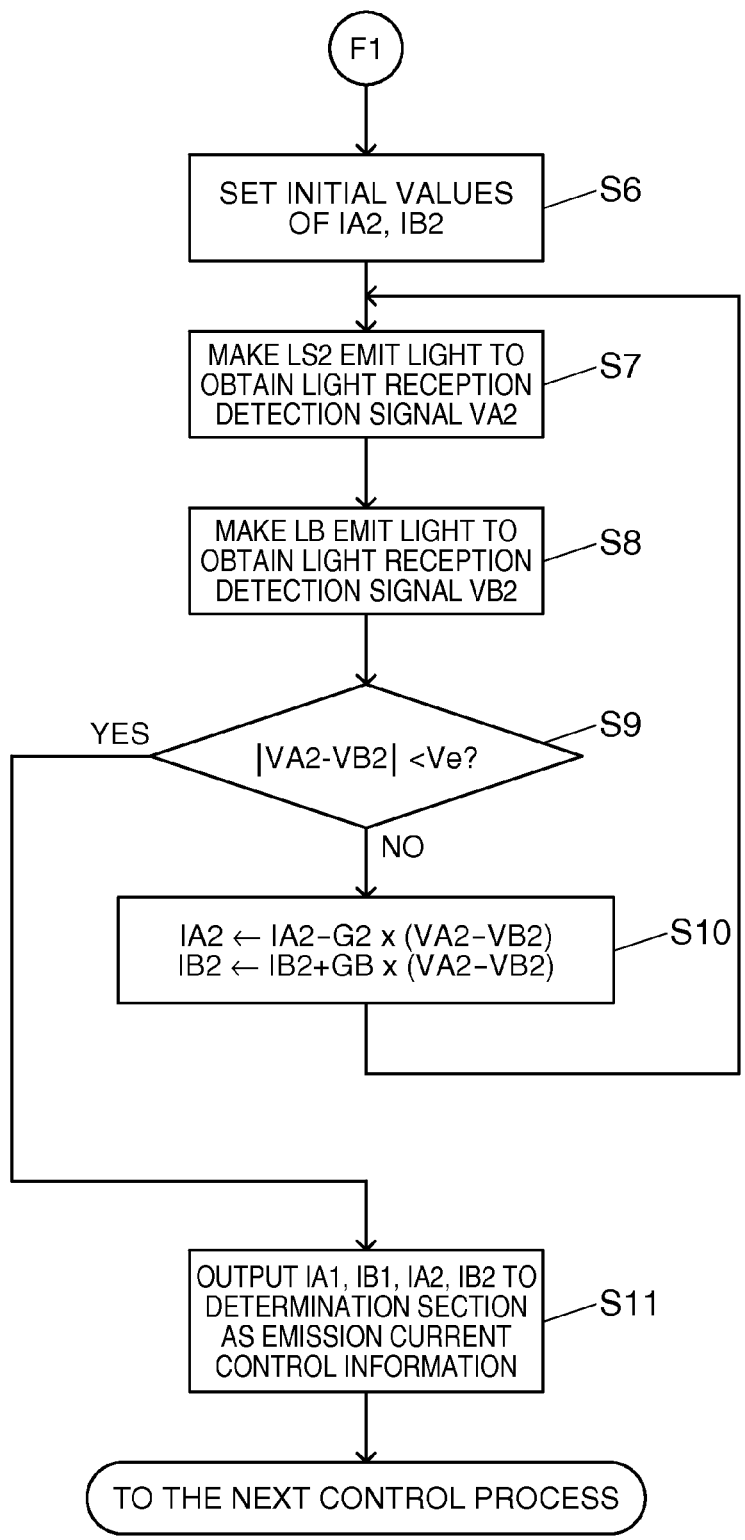
FIG. 7 is the example of the flowchart of the emission control.

FIGS. 6 and 7 show an example of the flowchart of the emission control described above. Firstly, the initial values of the current setting values IA1, IB1 of the emission currents of the first light source section LS1 and the reference light source section LB are set (step S1). Then, the first light source section LS1 is made to emit the light beam to thereby obtain the light reception detection signal VA1 (step S2). Subsequently, the reference light source section LB is made to emit the light beam to thereby obtain the light reception detection signal VB1 (step S3).

In the step S4, whether or not the absolute value of the difference VA1−VB1 in the light reception detection signal is smaller than a predetermined value Ve is determined. The predetermined value Ve is preferably set to an appropriate value taking the operation characteristics of the light receiving section RU, the signal detection circuit 111, the comparator circuit 112, and so on, the required position detection accuracy, and so on into consideration. If the absolute value of VA1−VB1 is not smaller than the predetermined value Ve, the current setting value IA1 is reduced as much as G1×(VA1−VB1), and the current setting value IB1 is increased as much as GB×(VA1−VB1) (step S5), and then the steps S2 through S4 are repeated. Here, G1 and GB are coefficients for determining the increments of the current setting values, and are set taking the characteristics of the light source sections LS1, LB into consideration.

If in the judgment in the step S4 the absolute value of VA1−VB1 is smaller than the predetermined value Ve, the process proceeds to the step S6 shown in FIG. 7. In the steps S6 through S10, the second light source section LS2 and the reference light source section LB are made to emit light beams alternately, and the same control as in the flow described above is performed. Then, the four current setting values IA1, IB1, IA2, and IB2 are determined finally, and are output to the determination section 120 (step S11).

The emission control in the first period is explained hereinabove. In the emission control in the second period, the four current setting values IA1d, IB1d, IA2d, and IB2d are determined, and then output to the determination section 120 along substantially the same control flow.

3. Positional Relationship Determination by Determination Section

The determination section 120 determines the positional relationship of the object OB with respect to the first and second light source sections LS1, LS2 based on the primary and secondary first period emission current control information LCNinit1, LCNinit2, the primary and secondary second period emission current control information LCNdet1, LCNdet2 obtained due to the emission control described above. Specifically, the primary first period emission current control information LCNinit1 corresponds to the current setting values IA1, IB1, the secondary first period emission current control information LCNinit2 corresponds to the current setting values IA2, IB2, the primary second period emission current control information LCNdet1 corresponds to the current setting values IA1d, IB1d, and the secondary second period emission current control information LCNdet2 corresponds to the current setting values IA2d, IB2d. Hereinafter, the formula for obtaining the positional relationship of the object OB from these current setting values will be explained.

Firstly, the period in which no object exists in the detection area, namely the first period will be explained. As shown in FIG. 3, the irradiation light beam LT1 and the outside light LO are received when the first light source section LS1 emits the light beam. Assuming that the emission current of the first light source section LS1 on this occasion is IA1, the coefficient of the first light source section LS1 for converting the current into the light is K1, the light path from the first light source section LS1 to the light receiving section RU is L1, the coefficient of the light receiving section RU for converting the light into the current is KP, and the intensity of the outside light LO is KA, the output current IPA1 of the light receiving section RU is obtained by the following formula.

$$IPA1 = KP \times (F(L1) \times K1 \times IA1 + KA) \qquad (1)$$

Here, F(L1) denotes the distance function representing the light attenuation with respect to the light path L1. The distance function F(L) is a function inversely proportional to the square of the distance if, for example, the light source is a point source. In reality, the distance function F(L) can be determined taking the positional relationship between the first light source section LS1 and the light receiving section RU, presence or absence of the light transmissive member TP, and so on into consideration.

Further, when the reference light source section LB emits the light beam, the incident light beam (the direct light beam) LTB from the reference light source section LB and the outside light LO are received. The output current IPB1 of the light receiving section RU on this occasion is obtained by the following formula assuming that the emission current of the reference light source section LB is IB1.

$$IPB1=KP\times(KB\times IB1+KA) \quad (2)$$

Here, the attenuation by the light path from the reference light source section LB to the light receiving section RU and the coefficient of the light receiving section RU for converting the current into the light are put together, and represented as a constant KB.

The signal detection circuit 111 converts the output current from the light receiving section RU into a voltage to thereby output the light reception detection signal. Assuming that the light reception detection signal voltage corresponding to the output current IPA1 described above is VA1, and the light reception detection signal voltage corresponding to the output current IPB1 described above is VB1, the light reception detection signal voltages VA1, VB1 are obtained by the following formulas.

$$VA1=R\times IPA1 \quad (3)$$

$$VB1=R\times IPB1 \quad (4)$$

Here, "R" is a constant determined from the characteristics of the signal detection circuit 111.

As described above, the control section 110 performs the emission control so that the light reception detection signal voltages VA1, VB1 become equal to each other, namely the difference VA1−VB1 becomes zero. The following formula can be obtained from the formulas (1) through (4) described above.

$$VA1-VB1=R\times KP\times(F(L1)\times K1\times IA1-KB\times IB1) \quad (5)$$

If VA1−VB1 in the above formula becomes zero, the following formula becomes true.

$$IA1/IB1=KB/(K1\times F(L1)) \quad (6)$$

In a similar manner, due to the emission control of the second light source section LS2 and the reference light source section LB, the following formula becomes true.

$$IA2/IB2=KB/(K2\times F(L2)) \quad (7)$$

Here, "K2" is a coefficient of the second light source section LS2 for converting the current into the light, and "L2" denotes the light path from the second light source section LS2 to the light receiving section RU. If L1=L2 is satisfied, the formulas (6) and (7) can be simplified as follows taking the ratio of the respective sides thereof.

$$K1/K2=(IB1\times IA2)/(IB2\times IA1) \quad (8)$$

Then, the period in which an object exists in the detection area, namely the second period will be explained. As shown in FIG. 4, the irradiation light beam LT1a, the reflected light beam LR1, and the outside light LO are received when the first light source section LS1 emits the light beam. Assuming that the emission current of the first light source section LS1 on this occasion is IA1d, the coefficient of the first light source section LS1 for converting the current into the light is K1, the light path of the irradiation light LT1a is L1, the light path (the light path from the first light source section LS1 to the object OB) of the irradiation light LT1b is LOB1, the reflectance of the object OB is KT, the light path (the light path from the object OB to the light receiving section RU) of the reflected light beam LR1 is LOR, the coefficient of the light receiving section RU for converting the light into the current is KP, and the intensity of the outside light LO is KA, the output current IPA1d of the light receiving section RU is obtained by the following formula.

$$IPA1d=KP\times(F(LOR)\times K1\times F(LOB1)\times K1\times IA1d+F(L1)\times K1\times IA1d+KA) \quad (9)$$

Here, F(LOB1) denotes the distance function (a first function in a broad sense) for representing the positional relationship of the object OB with respect to the first light source section LS1.

Further, the output current IPB1d when the reference light source section LB emits the light beam is obtained by the following formula assuming that the emission current of the reference light source section LB is IB1d.

$$IPB1d=KP\times(KB\times IB1d+KA) \quad (10)$$

Assuming that the light reception detection signal voltage corresponding to the output current IPA1d is VA1d, and the light reception detection signal voltage corresponding to the output current IPB1d is VB1d, the light reception detection signal voltages VA1d, VB1d are obtained by the following formulas.

$$VA1d=R\times IPA1d \quad (11)$$

$$VB1d=R\times IPB1d \quad (12)$$

The following formula can be obtained from the formulas (9) through (12) described above.

$$VA1d-VB1d=R\times KP\times(F(LOR)\times KT\times F(LOB1)\times K1\times IA1d+F(L1)\times K1\times IA1d-KB\times IB1d) \quad (13)$$

If VA1d−VB1d in the above formula becomes zero, the following formula becomes true.

$$IB1d/IA1d=(KT\times F(LOR)\times K1\times F(LOB1)+K1\times F(L1))/KB \quad (14)$$

In a similar manner, due to the emission control of the second light source section LS2 and the reference light source section LB, the following formula becomes true.

$$IB2d/IA2d=(KT\times F(LOR)\times K2\times F(LOB2)+K2\times F(L2))/KB \quad (15)$$

Here, LOB2 denotes the light path (the light path from the second light source section LS2 to the object OB) of the irradiation light beam LT2b, and F(LOB2) denotes the distance function (a second function in a broad sense) representing the positional relationship of the object OB with respect to the second light source section LS2.

When applying the formulas (6) and (7) to the formulas (14) and (15), the following can be obtained.

$$\begin{aligned}IB1d/IA1d &= (KT\times F(LOR)\times K1\times F(LOB1)+\\&\quad IB1\times KB/IA1)/KB\\&= KT\times F(LOR)\times K1\times F(LOB1)/\\&\quad KB+IB1/IA1\end{aligned} \quad (16)$$

$$\begin{aligned}IB2d/IA2d &= (KT\times F(LOR)\times K2\times F(LOB2)+\\&\quad IB2\times KB/IA2)/KB\\&= KT\times F(LOR)\times K2\times F(LOB2)/\\&\quad KB+IB2/IA2\end{aligned} \quad (17)$$

By modifying the formulas (16) and (17), the following can be obtained.

$$IB1d/IA1d-IB1/IA1=KT\times F(LOR)\times K1\times F(LOB1)/KB \quad (18)$$

$$IB2d/IA2d-IB2/IA2=KT\times F(LOR)\times K2\times F(LOB2)/KB \quad (19)$$

Here, by replacing the left side of the formula (18) with P1, and replacing the left side of the formula (19) with P2, the following can be obtained.

$$P1=KT \times F(LOR) \times K1 \times F(LOB1)/KB \quad (20)$$

$$P2=KT \times F(LOR) \times K2 \times F(LOB2)/KB \quad (21)$$

By taking the ratio of the respective sides of the formulas (20), (21), the following can be obtained.

$$P1/P2=(K1 \times F(LOB1))/(K2 \times F(LOB2)) \quad (22)$$

By substituting the K1/K2 in the above formula with the formula (8), the following can be obtained.

$$P1/P2=(IB1 \times IA2 \times F(LOB1))/(IB2 \times IA1 \times F(LOB2)) \quad (23)$$

Assuming that the value of the distance function F(LOB1) is FA1, the value of the distance function F(LOB2) is FA2, and the ratio between the values FA1, FA2 is FR, the following formulas can be obtained from the formula (23).

$$FR=FA1/FA2=F(LOB1)/F(LOB2)=Q1/Q2 \quad (24)$$

$$Q1=IB2 \times IA1 \times IB1d/IA1d-IB1 \times IB2 \quad (25)$$

$$Q2=IB1 \times IA2 \times IB2d/IA2d-IB1 \times IB2 \quad (26)$$

As is understood from the formulas (24) through (26), the ratio FR between the value of the distance function F(LOB1) and the value of the distance function F(LOB2) can be obtained from the current setting values IA1, IB1, IA2, IB2, IA1d, IB1d, IA2d, and IB2d. The form of the distance function can be determined from the positional relationship between the light source sections and so on.

As explained hereinabove, according to the processing device 100 of the present embodiment, the positional relationships between the light source sections LS1, LS2 and the object OB can be determined from the current setting values described above using the formulas (24) through (26). Further, since the formulas (24) through (26) do not include the light paths L1, L2 in the first period, the outside light KA, and the reflectance KT of the object, the influences of the light paths in the first period, the outside light, and the reflectance of the object can be eliminated. As a result, it becomes possible to, for example, perform the position detection with high accuracy even in the case of the object with different reflectance.

4. Position Detection without Using Reference Light Source Section

Figure 8:
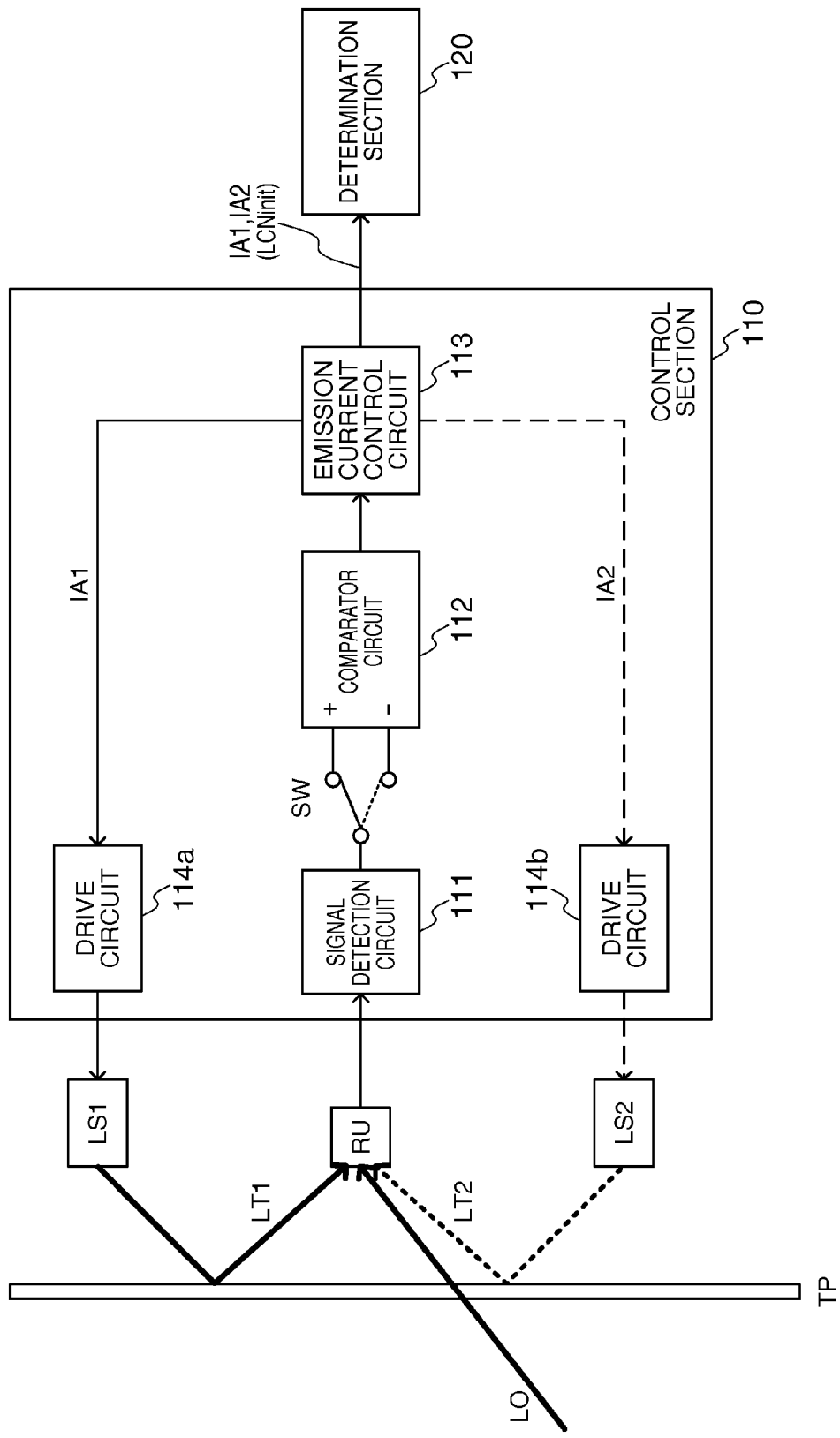
FIG. 8 is a diagram for explaining the emission control without using the reference light source section in the first period.

FIG. 8 is a diagram for explaining the emission control without using the reference light source section LB in the first period. The operations of the signal detection circuit 111, the switch circuit SW, the comparator circuit 112, the emission current control circuit 113, the drive circuits 114*a*, 114*b* are the same as those explained with reference to FIG. 3, and therefore, the detailed explanation therefor will be omitted here.

The control section 110 makes the first light source section LS1 and the second light source section LS2 emit light beams alternately, and performs the emission control so that the light reception result during the first light source section LS1 is emitting the light beam and the light reception result during the second light source section LS2 is emitting the light beam become equal to each other. Specifically, the control section 110 sets the current setting values IA1, IA2 of the emission currents of the first light source section LS1 and the second light source section LS2 so that the difference approximates to zero based on the comparison result (the difference between the light reception detection signals) of the comparator circuit 112. Further, the control section 110 outputs the current setting values IA1, IA2 in the case in which the two light reception results become equal to each other to the determination section 120 as the first period emission current control information LCNinit.

Figure 9:
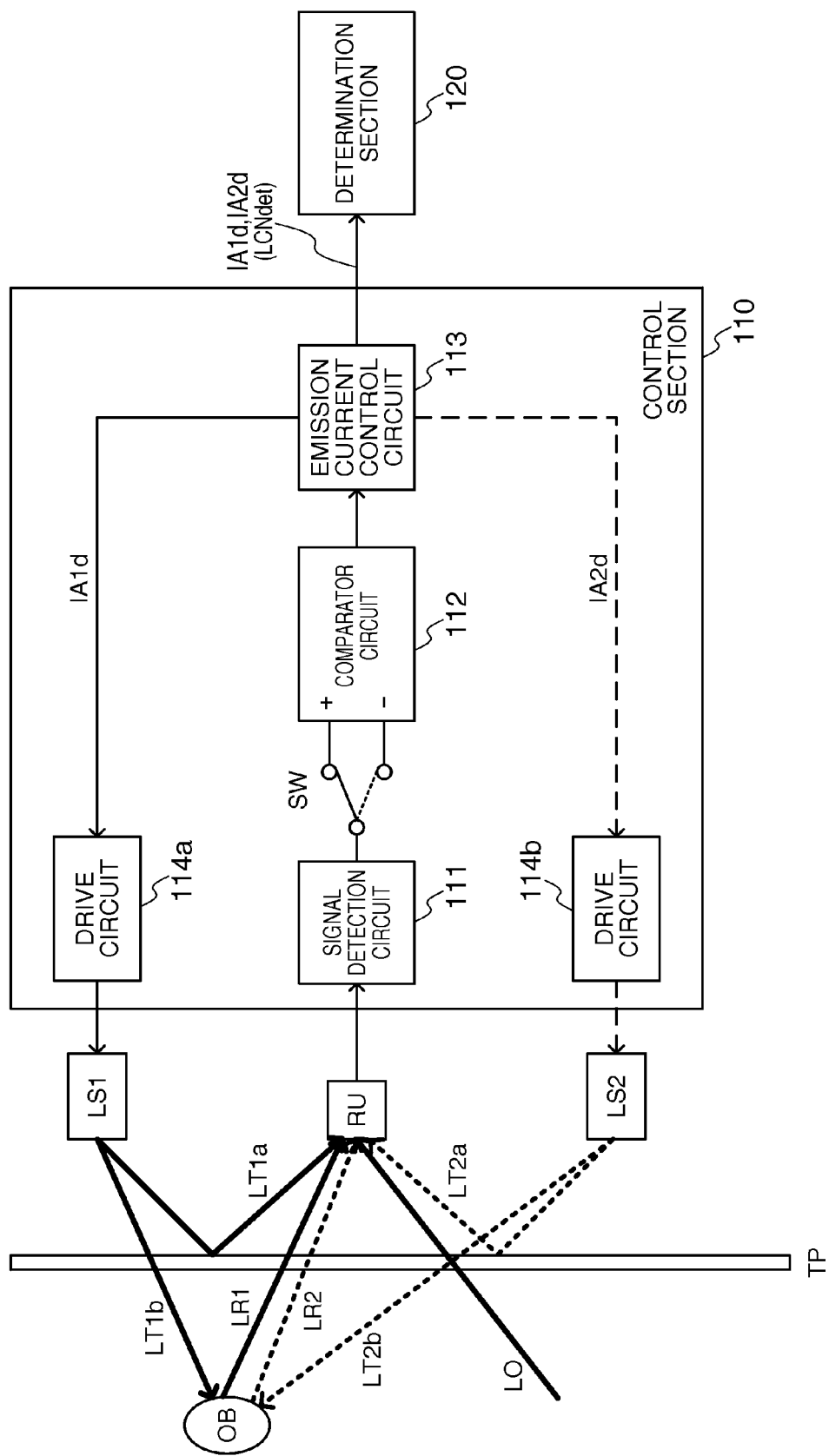
FIG. 9 is a diagram for explaining the emission control without using the reference light source section in the second period.

FIG. 9 is a diagram for explaining the emission control without using the reference light source section LB in the second period. The emission control in the second period is the same as the emission control in the first period described above. Specifically, the control section 110 makes the first light source section LS1 and the second light source section LS2 emit light beams alternately, and performs the emission control so that the light reception result during the first light source section LS1 is emitting the light beam and the light reception result during the second light source section LS2 is emitting the light beam become equal to each other. Specifically, the control section 110 sets the current setting values IA1*d*, IA2*d* of the emission currents of the first light source section LS1 and the second light source section LS2 so that the difference approximates to zero based on the comparison result (the difference between the light reception detection signals) of the comparator circuit 112. Further, the control section 110 outputs the current setting values IA1*d*, IA2*d* in the case in which the two light reception results become equal to each other to the determination section 120 as the second period emission current control information LCNdet.

The determination section 120 determines the positional relationship of the object OB with respect to the first and second light source sections LS1, LS2 based on the first period emission current control information LCNinit and the second period emission current control information LCNdet output from the control section 110.

The method of determining the positional relationship without using the reference light source section will hereinafter be described. Assuming the output currents of the light receiving section RU respectively while the first light source section LS1 is emitting the light beam and while the second light source section LS2 is emitting the light beam as IPA1, IPA2, the following can be obtained.

$$IPA1=KP \times (F(L1) \times K1 \times IA1+KA) \quad (27)$$

$$IPA2=KP \times (F(L2) \times K2 \times IA2+KA) \quad (28)$$

Assuming that the light reception detection signal voltage corresponding to the output current IPA1 is VA1, and the light reception detection signal voltage corresponding to the output current IPA2 is VA2, the light reception detection signal voltages VA1, VA2 are obtained by the following formulas.

$$VA1=R \times IPA1 \quad (29)$$

$$VA2=R \times IPA2 \quad (30)$$

The control section 110 performs the emission control so that the light reception detection signal voltages VA1, VA2 become equal to each other, namely the difference VA1−VA2 becomes zero. The following formula can be obtained from the formulas (27) through (30) described above.

$$VA1-VA2=R \times KP \times (F(L1) \times K1 \times IA1-F(L2) \times K2 \times IA2) \quad (31)$$

If VA1−VA2 in the above formula becomes zero, the following formula becomes true.

$$IA1/IA2=(K2 \times F(L2))/(K1 \times F(L1)) \quad (32)$$

Here, if L1=L2 is satisfied, the formulas (31) and (32) can be simplified as follows taking the ratio of the respective sides thereof.

$$IA1/IA2=K2/K1 \quad (33)$$

Then, the period in which an object exists in the detection area, namely the second period will be explained. Assuming that the output current of the light receiving section RU while the first light source section LS1 is emitting the light beam is IPA1$d$, and the output current of the light receiving section RU while the second light source section LS2 is emitting the light beam is IPA2$d$, the following can be obtained.

$$IPA1d=KP\times(F(LOR)\times K1\times F(LOB1)\times K1\times IA1d+F(L1)\times K1\times IA1d+KA) \quad (34)$$

$$IPA2d=KP\times(F(LOR)\times K1\times F(LOB2)\times K2\times IA2d+F(L2)\times K2\times IA2d+KA) \quad (35)$$

Here, F(LOB1) is the distance function (the first function in a broad sense) representing the positional relationship of the object OB with respect to the first light source section LS1, and F(LOB2) is the distance function (the second function in a broad sense) representing the positional relationship of the object OB with respect to the second light source section LS2.

Assuming that the light reception detection signal voltage corresponding to the output current IPA1$d$ is VA1$d$, and the light reception detection signal voltage corresponding to the output current IPA2$d$ is VA2$d$, the light reception detection signal voltages VA1$d$, VA2$d$ are obtained by the following formulas.

$$VA1d=R\times IPA1d \quad (36)$$

$$VA2d=R\times IPA2d \quad (37)$$

The control section 110 performs the emission control so that the light reception detection signal voltages VA1$d$, VA2$d$ become equal to each other, namely the difference VA1$d$−VA2$d$ becomes zero. The following formula can be obtained from the formulas (34) through (37) described above.

$$VA1d-VA2d=R\times KP\times(F(LOR)\times KT\times F(LOB1)\times K1\times IA1d+F(L1)\times K1\times IA1d-F(LOR)\times KT\times F(LOB2)\times K2\times IA2d-F(L2)\times K2\times IA2d) \quad (38)$$

If VA1$d$−VA2$d$ in the above formula becomes zero, the following formula becomes true.

$$IA2d/IA1d=(F(LOR)\times KT\times F(LOB1)\times K1+F(L1)\times K1)/(F(LOR)\times KT\times F(LOB2)\times K2+F(L2)\times K2) \quad (39)$$

Here, if the distance functions F(L1), F(L2) in the first period are sufficiently smaller than the distance functions F(LOR), F(LOB1), and F(LOB2) in the second period, it is possible to neglect the terms related to the first period in the formula (39). For example, in FIG. 9, by reducing the reflectance of the light transmissive member TP, the distance functions F(L1), F(L2) can be made sufficiently small. By neglecting the terms of F(L1)×K1 and F(L2)×K2 in the formula (39), the following formula can be obtained.

$$IA2d/IA1d=(F(LOB1)\times K1)/(F(LOB2)\times K2) \quad (40)$$

Assuming that the value of the distance function F(LOB1) is FA1, the value of the distance function F(LOB2) is FA2, and applying the formula (33) to the formula described above to reorder the formula, the ratio FR between the values FA1, FA2 can be obtained as follows.

$$FR=FA1/FA2=F(LOB1)/F(LOB2)=(IA1\times IA2d)/(IA2\times IA1d) \quad (41)$$

As is understood from the formula (41), the ratio FR between the value of the distance function F(LOB1) and the value of the distance function F(LOB2) can be obtained from the current setting values IA1, IA2, IA1$d$, and IA2$d$. The form of the distance function can be determined from the positional relationship between the light source sections and so on.

As explained hereinabove, according to the processing device 100 of the present embodiment, even in the case in which the reference light source section is not used, the positional relationship between the light source sections LS1, LS2 and the object OB can be determined using the formula (41) if the terms related to the first period (the initial paths of the light beams) can be neglected. Since the position detection can be performed with the simple configuration not including the reference light source section by adopting such a configuration, the efficient position detection corresponding to the purpose becomes possible.

5. Optical Detection Device, Display Device, and Electronic Apparatus

Figure 10A:
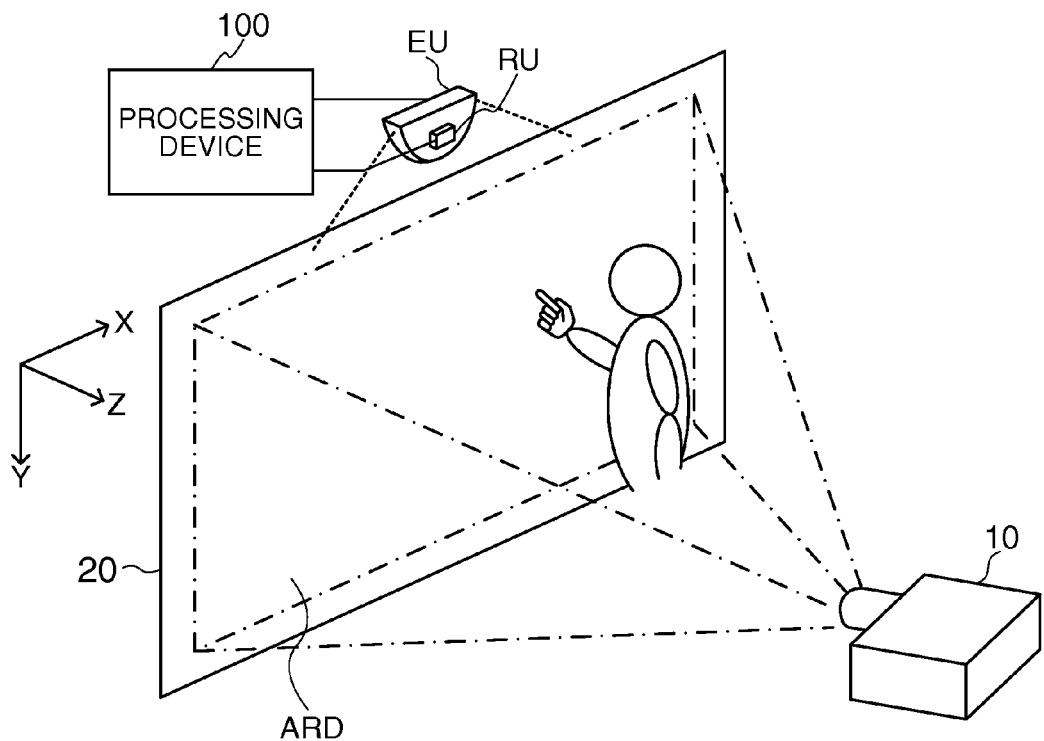
FIGS. 10A and 10B are diagrams showing a basic configuration example of the optical detection device, and the display device and the electronic apparatus using the optical detection device.
Figure 10B:
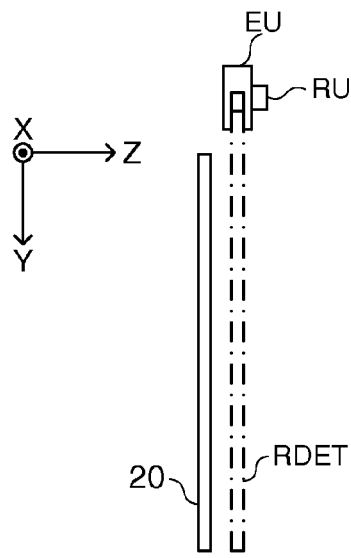

FIGS. 10A and 10B show a basic configuration example of the optical detection device according to the present embodiment, and a display device and an electronic apparatus using the optical detection device. FIGS. 10A and 10B show an example of the case in which the optical detection device according to the present embodiment is applied to a liquid crystal projector or a projection display device (a projector) called a digital micromirror device. In FIGS. 10A and 10B, the axes intersecting with each other are defined as an X-axis, a Y-axis, and a Z-axis (first, second, and third coordinate axes in a broad sense). Specifically, the X-axis is defined as the lateral direction, the Y-axis is defined as the vertical direction, and the Z-axis is defined as the depth direction.

The optical detection device according to the present embodiment includes an irradiation section EU, the light receiving section RU, and the processing device 100. Further, the display device (the electronic apparatus) according to the present embodiment includes the optical detection device and a screen 20 (a display section in a broad sense). Further, the display device (the electronic apparatus) can include an image projection device 10 (an image generation device in a broad sense). It should be noted that the configuration of the optical detection device, the display device, and the electronic apparatus according to the present embodiment is not limited to the configuration shown in FIGS. 10A and 10B, but various practical modifications such as elimination of some of the constituents or addition of other constituents are possible.

The image projection device 10 projects the image display light in an enlarged manner from the projection lens disposed on the front side of the housing toward the screen 20. Specifically, the image projection device 10 generates the display light with a color image, and emits it toward the screen 20 via the projection lens. Thus, it becomes possible to display the color image in the display area ARD of the screen 20.

The optical detection device according to the present embodiment optically detects the object such as a finger of the user or a stylus pen in the detection area RDET set in front of (on the Z-axis direction side of) the screen 20 as shown in FIG. 10B. In order for achieving this configuration, the irradiation section EU of the optical detection device emits the irradiation light beam (the detection light beam) for detecting the object. Specifically, the irradiation section EU radially emits the irradiation light beam having the intensity (illuminance) varying in accordance with the irradiation direction. Thus, the irradiation light intensity distribution having the intensity varying in accordance with the irradiation direction is formed in the detection area RDET. It should be noted that the detection area RDET is an area set on the Z-axis direction side (the user side) of the screen 20 (the display section) along the X-Y plane.

The light receiving section RU receives the reflected light beam, which is the irradiation light beam from the irradiation section EU reflected by the object. The light receiving section RU can be realized with the light receiving element such as a photo diode or a photo transistor. The processing device 100 is connected to the light receiving section RU in, for example, an electrical manner. It should be noted that, although not shown in the drawings, it is possible to provide the reference light source section in the vicinity of the light receiving section RU.

The processing device 100 performs various types of control processing of the optical detection device. Specifically, the processing device performs the emission control of the light source sections and the reference light source section provided to the irradiation section EU. The processing device 100 is electrically connected to the irradiation section EU. The function of the processing device 100 can be realized by an integrated circuit device or the software operating on the microcomputer. For example, if the irradiation section EU includes the first and second light source sections, the processing device 100 performs the control of making the first and second light source sections emit light beams alternately. Further, if the first and second irradiation sections are provided as described later, the processing device 100 performs the control of making the first and second light source sections provided to the first irradiation section emit light beams alternately in the first period for obtaining the direction of the object with respect to the first irradiation section. Further, the processing device 100 performs the control of making the third and fourth light source sections provided to the second irradiation section emit light beams alternately in the second period for obtaining the direction of the object with respect to the second irradiation section.

It should be noted that the optical detection device according to the present embodiment can be applied not only to the projection display device shown in FIG. 10A but also to various display devices installed in various types of electronic apparatuses. Further, as the electronic apparatuses to which the optical detection device according to the present embodiment is applied, there can be assumed a variety of apparatuses such as a personal computer, a car navigation system, a ticket-vending machine, a personal digital assistance, and a banking terminal. The electronic apparatus can include, for example, a display section (a display device) for displaying an image, an input section for inputting information, and a processing section for performing various types of processing based on, for example, the information thus input.

Figure 11:
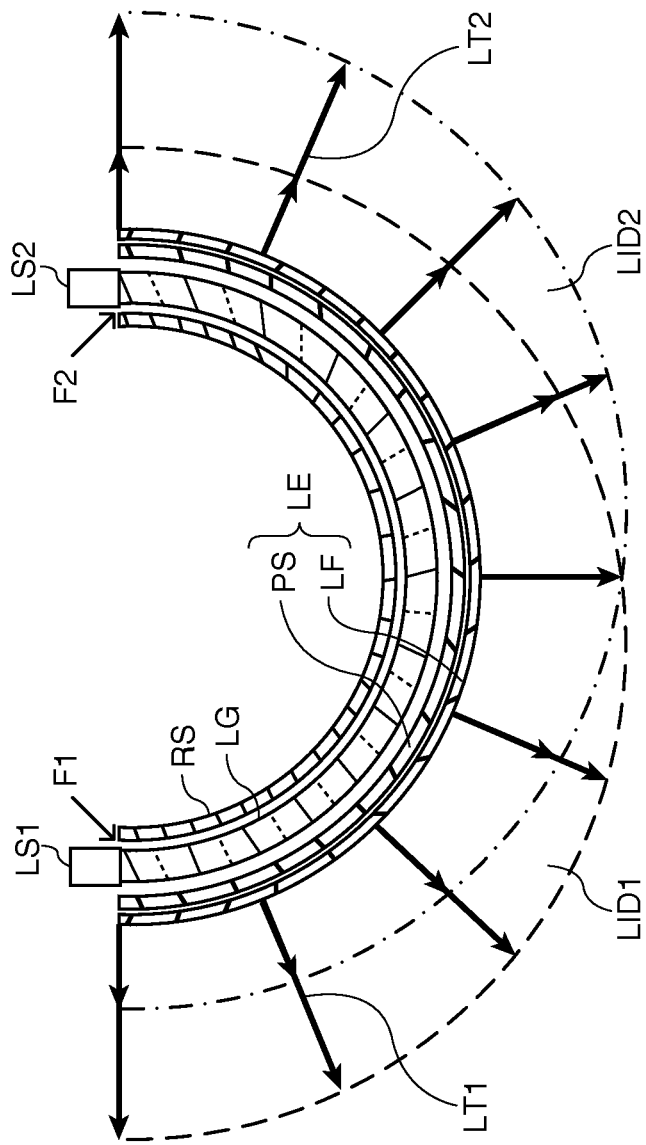
FIG. 11 is a diagram showing a detailed configuration example of an irradiation section.

FIG. 11 shows a detailed configuration example of the irradiation section EU included in the optical detection device according to the present embodiment. The irradiation section EU of the configuration example shown in FIG. 11 includes the light source sections LS1, LS2, a light guide LG, and an irradiation direction setting section LE. Further, a reflecting sheet RS is also included. Further, the irradiation direction setting section LE includes an optical sheet PS and a louver film LF. It should be noted that the irradiation section EU of the present embodiment is not limited to the configuration shown in FIG. 11, and can be put into practice in variously modified forms such as elimination of some of the constituents, replacement with other constituents, or addition of other constituents.

The light source sections LS1, LS2 are for emitting the source light beams, and each provided with a light emitting element such as a light emitting diode (LED). The light source sections LS1, LS2 emit the source light beam, for example, of an infrared light beam (a near infrared light beam near to the visible light range). That is, it is preferable that the source light beam emitted by each of the light source sections LS1, LS2 is a light beam in the wavelength band with which the light beam is effectively reflected by the object such as a finger of the user or a stylus pen, or a light beam in the wavelength band with which the light beam is hardly included in the environment light to be the disturbance light. Specifically, the source light beam is an infrared light beam with the wavelength around 850 nm, which is the light beam in the wavelength band with high reflectance on the surface of a human body, or an infrared light beam with the wavelength around 950 nm, which is the light beam in the wavelength band with which the light beam hardly included in the environment light.

The light source section LS1 is disposed on one end of the light guide LG as indicated by the symbol F1 in FIG. 11. Further, the second light source section LS2 is disposed on the other end of the light guide LG as indicated by the symbol F2. Further, the light source section LS1 emits the source light beam toward the light entrance surface of the one end (F1) of the light guide LG to thereby emit the irradiation light beam LT1, and form (set) the first irradiation light intensity distribution LID1 in the detection area of the object. Meanwhile, the light source section LS2 emits the second source light beam toward the light entrance surface of the other end (F2) of the light guide LG to thereby emit the second irradiation light beam LT2, and form the second irradiation light intensity distribution LID2 with different intensity distribution from the first irradiation light intensity distribution LID1 in the detection area. As described above, the irradiation section EU is capable of emitting the irradiation light beam having the intensity distribution varying in accordance with the position in the detection area RDET.

The light guide LG (the light guide member) is for guiding the source light beams emitted by the light source sections LS1, LS2. For example, the light guide LG has a curved shape, and guides the source light beams from the light source sections LS1, LS2 along a curved light guide path. Specifically, in FIG. 11, the light guide LG has a circular arc shape. It should be noted that although the light guide LG has the circular arc shape with the central angle of 180 degrees in FIG. 11, it is also possible that for the light guide LG to have a circular arc shape with the central angle smaller than 180 degrees. The light guide LG is made of, for example, a transparent resin member such as acrylic resin or polycarbonate.

On at least one of the outer circumferential side and the inner circumferential side of the light guide LG, there is performed a process for adjusting the emission efficiency of the source light beam from the light guide LG. As the method of the process, there can be adopted various methods such as a serigraphy method for printing the reflecting dots, a molding method for providing a concavo-convex shape using a stamper or injection, and a groove processing method.

The irradiation direction setting section LE (the irradiation light emitting section) realized with the prism sheet PS and the louver film LF is disposed on the outer circumferential side of the light guide LG, and receives the source light beam emitted from the outer circumferential side (the outer circumferential surface) of the light guide LG. Then, the irradiation direction setting section LE emits the irradiation light beams LT1, LT2 having the irradiation direction set to the direction from the inner circumferential side to the outer circumferential side of the light guide LG having the curved shape (the circular arc shape). In other words, the irradiation direction setting section LE sets (restricts) the direction of the source light beams emitted from the outer circumferential side of the light guide LG to the irradiation direction along, for example, the normal direction (the radial direction) of the light guide LG. Thus, it becomes that the irradiation light beams LT1, LT2 are emitted radially, in the direction from the inner circumferential side toward the outer circumferential side of the light guide LG.

The setting of the irradiation directions of the irradiation light beams LT1, LT2 described above is realized by the prism sheet PS and the louver film LF of the irradiation direction setting section LE. For example, the prism sheet PS raises the direction of the source light beam emitted from the outer circumferential side of the light guide LG with a low viewing angle toward the normal direction to thereby set the direction so that the peak of the emission characteristics is in the normal direction. Further, the louver film LF blocks (cuts) the light beam (low-viewing angle light beam) with the direction other than the normal direction.

As described above, according to the irradiation section EU of the present embodiment, the light source sections LS1, LS2 are respectively disposed on the both ends of the light guide LG, and are made to light alternately, thereby making it possible to form two irradiation light intensity distributions. In other words, the irradiation light intensity distribution LID1 having higher intensity on the one end of the light guide LG and the irradiation light intensity distribution LID2 having higher intensity on the other end of the light guide LG can be formed alternately.

By forming such irradiation light intensity distributions LID1, LID2, and receiving the reflected light beams of the object due to the irradiation light beams with these intensity distribution, it becomes possible to detect the object with higher accuracy while suppressing the influence of the disturbance light such as the environment light to the minimum. In other words, it becomes possible to cancel out the infrared component included in the disturbance light, and therefore, it becomes possible to suppress the harmful influence of the infrared component exerted on the detection of the object to the minimum.

Figure 12:
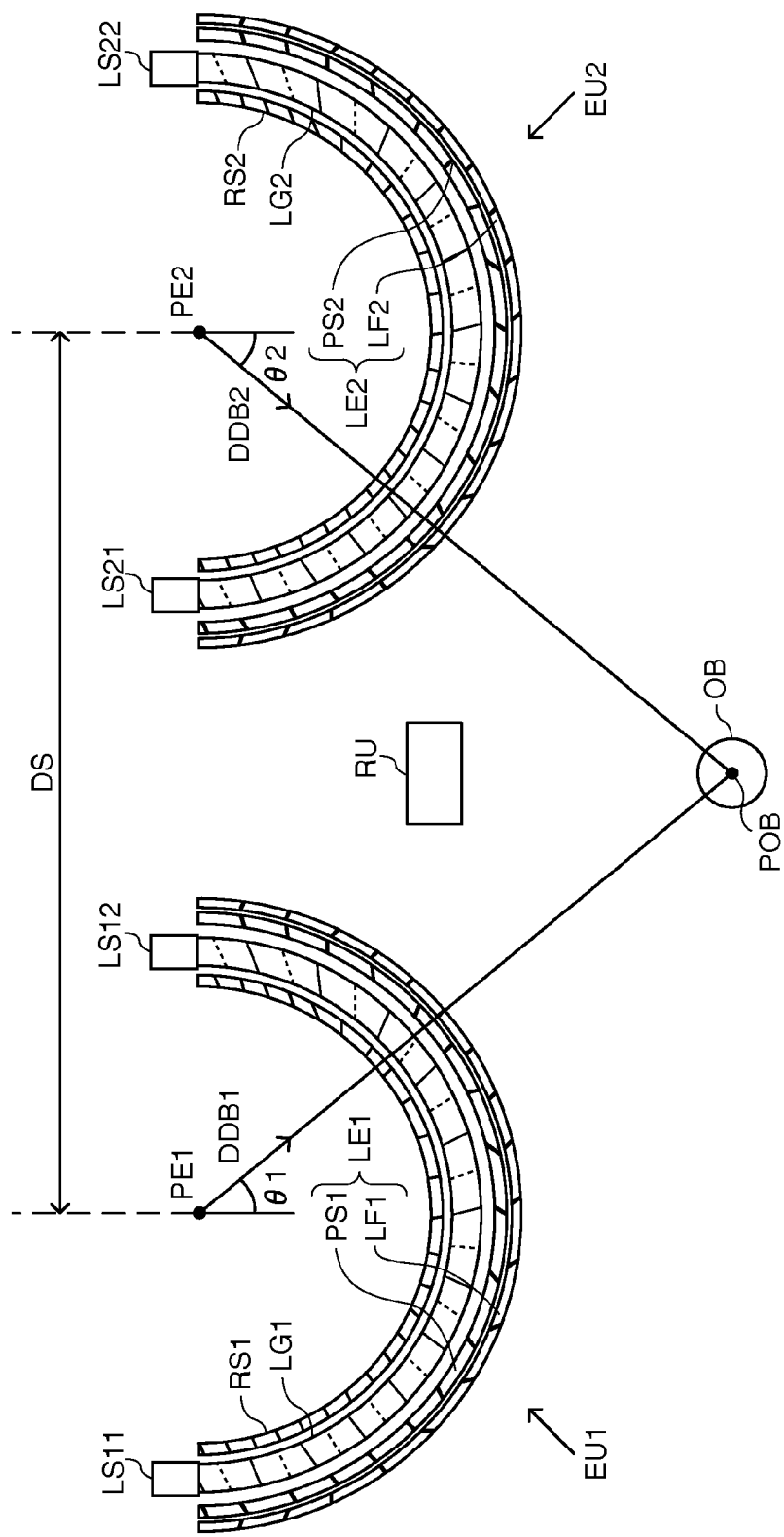
FIG. 12 is a diagram showing a modified example of the irradiation section.

FIG. 12 shows a modified example of the irradiation section EU of the present embodiment. In FIG. 12, as the irradiation section EU, there are provided first and second irradiation sections EU1, EU2. These first and second irradiation sections EU1, EU2 are disposed with a predetermined distance DS in the direction along the surface of the detection area RDET for the object OB. In other words, the first and second irradiation sections EU1, EU2 are disposed with the distance DS along the X-axis direction shown in FIGS. 10A and 10B.

The first irradiation section EU1 radially emits the first irradiation light beam having the intensity varying in accordance with the irradiation direction. The second irradiation section EU2 radially emits the second irradiation light beam having the intensity varying in accordance with the irradiation direction. The light receiving section RU receives a first reflected light beam caused by the object OB reflecting the first irradiation light beam from the first irradiation section EU1, and a second reflected light beam caused by the object OB reflecting the second irradiation light beam from the second irradiation section EU2. Subsequently, the processing device 100 detects the position POB of the object OB based on the light reception result in the light receiving section RU.

Specifically, the processing device 100 detects the direction of the object OB with respect to the first irradiation section EU1 as a first direction DDB1 (an angle θ1) based on the light reception result of the first reflected light beam. Further, the processing device 100 detects the direction of the object OB with respect to the second irradiation section EU2 as a second direction DDB2 (an angle θ2) based on the light reception result of the second reflected light beam. Then, the position POB of the object OB is obtained based on the first direction DDB1 (θ1) and the second direction DDB2 (θ2), and the distance DS between the first and second irradiation sections EU1, EU2.

Figure 13A:
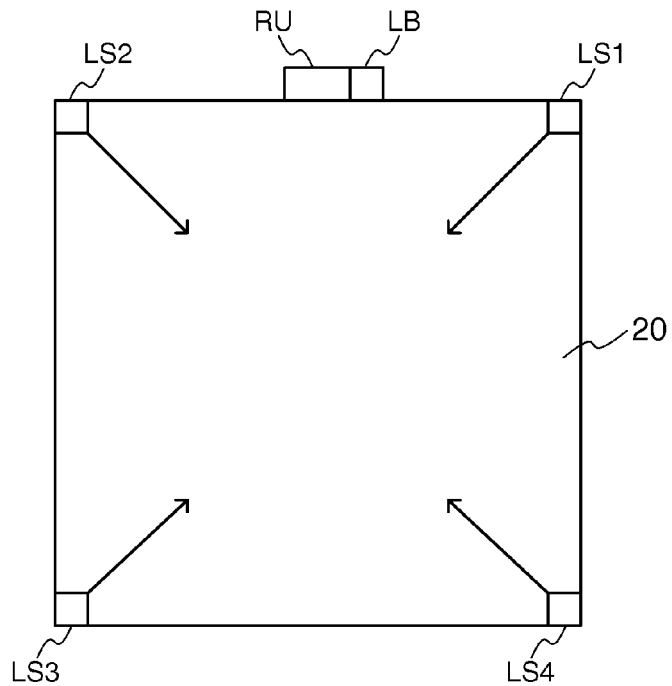
FIGS. 13A and 13B are diagrams showing modified examples of the optical detection device.
Figure 13B:
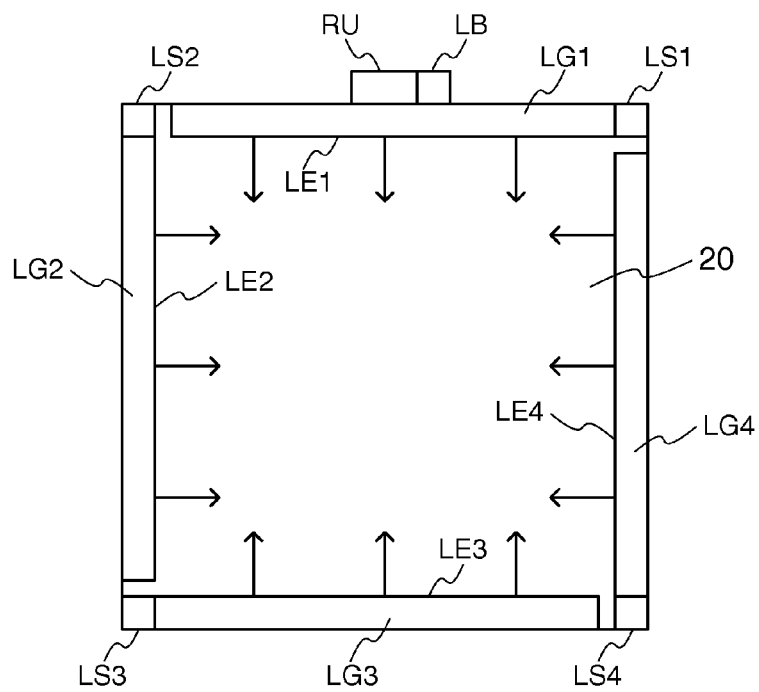

The optical detection device according to the present embodiment is not limited to the configuration described above, but can be put into practice with various modifications. FIGS. 13A and 13B are diagrams showing modified examples of the optical detection device. In the modified example shown in FIG. 13A, the light source sections LS1 through LS4 are disposed at the respective corners of the screen 20. Further, in the modified example shown in FIG. 13B, the light guides LG1 through LG4 and the irradiation direction setting sections LE1 through LE4 are further provided in accordance with the light source sections LS1 through LS4. These light guides LG1 through LG4 and the irradiation direction setting sections LE1 through LE4 are disposed on, for example, the respective sides of the screen 20, and emit irradiation light beams in the directions perpendicular to the respective sides toward the inside of the screen 20.

The processing device 100 performs the emission control of making, for example, the first light source section LS1 and the reference light source section LB emit light beams alternately, then performs the emission control of the second light source section LS2 and the reference light source section LB, then performs the emission control of the third light source section LS3 and the reference light source section LB and the emission control of the fourth light source section LS4 and the reference light source section LB sequentially. Further, it is also possible to perform the emission control of, for example, the first light source section LS1 and the third light source section LS3, and then perform the emission control of the second light source section LS2 and the fourth light source section LS4 without providing the reference light source section LB.

It should be noted that although the present embodiment is hereinabove explained in detail, it should easily be understood by those skilled in the art that various modifications not substantially departing from the novel matters and the effects of the invention are possible. Therefore, such modified examples should be included in the scope of the invention. For example, a term described at least once with a different term having a broader sense or the same meaning in the specification or the accompanying drawings can be replaced with the different term in any part of the specification or the accompanying drawings. Further, the configurations and the operations of the processing device, the optical detection device, the display device, and the electronic apparatus are not limited to those explained in the present embodiment, but can be put into practice with various modifications.

The entire disclosure of Japanese Patent Application No. 2010-133683, filed Jun. 11, 2010 is expressly incorporated by reference herein.

What is claimed is:

1. An optical detection device comprising:
a first light source section and a second light source section each adapted to emit an irradiation light beam;
a reference light source section adapted to emit an irradiation reference light beam;
a light receiving section adapted to receive the irradiation light beams reflected by an object, the light receiving section adapted to receive the irradiation reference light beam directly from the reference light source section;
a control section adapted to perform emission control of the first light source section, the second light source section, and the reference light source section based on a light reception result of the light receiving section; and
a determination section adapted to determine a positional relationship of the object with respect to the first light source section and the second light source section based on emission current control information for performing the emission control, wherein the determination section determines the positional relationship between the first and second light source sections and the object based on first period emission current control information as the emission current control information in a first period in which the object fails to exist in a detection area as an area where the object is detected and second period emission current control information as the emission current control information in a second period in which the object exists in the detection area.

2. The optical detection device according to claim 1, wherein the control section performs, in the first period, the emission control of the first light source section and the reference light source section so that the light reception result of the light receiving section when the first light source section emits the irradiation light beam and the light reception result of the light receiving section when the reference light source section emits the irradiation reference light beam become equal to each other, and the emission control of the second light source section and the reference light source section so that the light reception result of the light receiving section when the second light source section emits the irradiation light beam and the light reception result of the light receiving section when the reference light source section emits the irradiation reference light beam become equal to each other, and the control section performs, in the second period, the emission control of the first light source section and the reference light source section so that the light reception result of the light receiving section when the first light source section emits the irradiation light beam and the light reception result of the light receiving section when the reference light source section emits the irradiation reference light beam become equal to each other, and the emission control of the second light source section and the reference light source section so that the light reception result of the light receiving section when the second light source section emits the irradiation light beam and the light reception result of the light receiving section when the reference light source section emits the irradiation reference light beam become equal to each other.

3. The optical detection device according to claim 1, wherein the control section outputs, in the first period, primary first period emission current control information for setting currents respectively flow through the first light source section and the reference light source section to the determination section so that the light reception result of the light receiving section when the first light source section emits the irradiation light beam and the light reception result of the light receiving section when the reference light source section emits the irradiation reference light beam become equal to each other, and secondary first period emission current control information for setting currents respectively flow through the second light source section and the reference light source section to the determination section so that the light reception result of the light receiving section when the second light source section emits the irradiation light beam and the light reception result of the light receiving section when the reference light source section emits the irradiation reference light beam become equal to each other, and the control section outputs, in the second period, primary second period emission current control information for setting currents respectively flow through the first light source section and the reference light source section to the determination section so that the light reception result of the light receiving section when the first light source section emits the irradiation light beam and the light reception result of the light receiving section when the reference light source section emits the irradiation reference light beam become equal to each other, and secondary second period emission current control information for setting currents respectively flow through the second light source section and the reference light source section to the determination section so that the light reception result of the light receiving section when the second light source section emits the irradiation light beam and the light reception result of the light receiving section when the reference light source section emits the irradiation reference light beam become equal to each other, and the determination section determines the positional relationship of the object with respect to the first light source section and the second light source section based on the primary first period emission current control information, the secondary first period emission current control information, the primary second period emission current control information, and secondary second period emission current control information.

4. The optical detection device according to claim 1, wherein the control section performs, in the first period, the emission control of the first light source section and the second light source section so that the light reception result of the light receiving section when the first light source section emits the irradiation light beam and the light reception result of the light receiving section when the second light source section emits the irradiation light beam become equal to each other, and the control section performs, in the second period, the emission control of the first light source section and the second light source section so that the light reception result of the light receiving section when the first light source section emits the irradiation light beam and the light reception result of the light receiving section when the second light source section emits the irradiation light beam become equal to each other.

5. The optical detection device according to claim 3, wherein assuming that current setting values of the currents respectively flowing through the first light source section and the reference light source section, which correspond to the primary first period emission current control information, are IA1 and IB1, current setting values of the currents respectively flowing through the second light source section and the reference light source section, which correspond to the secondary first period emission current control information, are IA2 and IB2, current setting values of the currents respectively flowing through the first light source section and the reference light source section, which correspond to the primary second period emission current control information, are IA1$d$ and IB1$d$, current setting values of the currents respectively flowing through the second light source section and the reference light source section, which correspond to the secondary second period emission current control information, are IA2$d$ and IB2$d$, a value of a first function representing the positional relationship of the object with respect to the first light source section is FA1, a value of a second function representing the positional relationship of the object with respect to the second light source section is FA2, and a ratio between the value FA1 of the first function and the value FA2 of the second function is FR, the determination section determines the positional relationship of the object with respect to the first light source section and the second light source section by obtaining the ratio FR between the value FA1 of the first function and the value FA2 of the second function using the following relational expression:

$$FR=(IB2\times IA1\times IB1d/IA1d-IB1\times IB2)/(IB1\times IA2\times IB2d/IA2d-IB1\times IB2).$$

6. A display device comprising the optical detection device according to claim 1.

7. The optical detection device according to claim 4, wherein the control section outputs, in the first period, the first period emission current control information for setting currents respectively flow through the first light source section and the second light source section to the determination section so that the light reception result of the light receiving section when the first light source section emits the irradiation light beam and the light reception result of the light receiving section when the second light source section emits the irradiation light beam become equal to each other, and the control section outputs, in the second period, the second period emission current control information for setting currents respectively flow through the first light source section and the second light source section to the determination section so that the light reception result of the light receiving section when the first light source section emits the irradiation light beam and the light reception result of the light receiving section when the second light source section emits the irradiation light beam become equal to each other, and the determination section determines the positional relationship of the object with respect to the first light source section and the second light source section based on the first period emission current control information and the second period emission current control information.

8. The optical detection device according to claim 7, wherein assuming that current setting values of the currents respectively flowing through the first light source section and the second light source section, which correspond to the first period emission current control information, are IA1 and IA2, current setting values of the currents respectively flowing through the first light source section and the second light source section, which correspond to the second period emission current control information, are IA1$d$ and IA2$d$, a value of a first function representing the positional relationship of the object with respect to the first light source section is FA1, a value of a second function representing the positional relationship of the object with respect to the second light source section is FA2, and a ratio between the value FA1 of the first function and the value FA2 of the second function is FR, the determination section determines the positional relationship of the object with respect to the first light source section and the second light source section by obtaining the ratio FR between the value FA1 of the first function and the value FA2 of the second function using the following relational expression:

$$FR=(IA1\times IA2d)/(IA2\times IA1d).$$

9. The optical detection device according to claim 8, further comprising:

a light guide having a curved shape and adapted to guide a first source light beam from the first light source section and a second source light beam from the second light source section along a curved light guide path; and an irradiation direction setting section adapted to receive the first source light beam and the second source light beam emitted from an outer circumferential side of the light guide and set the irradiation direction of the irradiation light beam to a direction from an inner circumferential side toward the outer circumferential side of the light guide having the curved shape.

10. A processing device comprising:

a control section adapted to perform emission control of a first light source section, a second light source section, and a reference light source based on a light reception result of a light receiving section adapted to receive a reflected light beam caused by an object reflecting irradiation light beams from the first light source section and the second light source section and adapted to receive an irradiation reference light beam directly from a reference light source section; and a determination section adapted to determine a positional relationship of the object with respect to the first light source section and the second light source section based on emission current control information for performing the emission control, wherein the determination section determines the positional relationship between the first and second light source sections and the object based on first period emission current control information as the emission current control information in a first period in which the object fails to exist in a detection area as an area where the object is detected and second period emission current control information as the emission current control information in a second period in which the object exists in the detection area.

11. The processing device according to claim 10, wherein the control section performs, in the first period, the emission control of the first light source section and the reference light source section so that the light reception result of the light receiving section when the first light source section emits the irradiation light beam and the light reception result of the light receiving section when the reference light source section emits the irradiation reference light beam become equal to each other, and the emission control of the second light source section and the reference light source section so that the light reception result of the light receiving section when the second light source section emits the irradiation light beam and the light reception result of the light receiving section when the reference light source section emits the irradiation reference light beam become equal to each other, and the control section performs, in the second period, the emission control of the first light source section and the reference light source section so that the light reception result of the light receiving section when the first light source section emits the irradiation light beam and the light reception result of the light receiving section when the reference light source section emits the irradiation reference light beam become equal to each other, and the emission control of the second light source section and the reference light source section so that the light reception result of the light receiving section when the second light source section emits the irradiation light beam and the light reception result of the light receiving section when the reference light source section emits the irradiation reference light beam become equal to each other.

12. The processing device according to claim 10, wherein the control section outputs, in the first period, primary first period emission current control information for setting currents respectively flow through the first light source section and the reference light source section to the determination section so that the light reception result of the light receiving section when the first light source section emits the irradiation light beam and the light reception result of the light receiving section when the reference light source section emits the irradiation reference light beam become equal to each other, and secondary first period emission current control information for setting currents respectively flow through the second light source section and the reference light source section to the determination section so that the light reception result of the light receiving section when the second light source section emits the irradiation light beam and the light reception result of the light receiving section when the reference light source section emits the irradiation reference light beam become equal to each other, and the control section outputs, in the second period, primary second period emission current control information for setting currents respectively flow through the first light source section and the reference light source section to the determination section so that the light reception result of the light receiving section when the first light source section emits the irradiation light beam and the light reception result of the light receiving section when the reference light source section emits the irradiation reference light beam become equal to each other, and secondary second period emission current control information for setting currents respectively flow through the second light source section and the reference light source section to the determination section so that the light reception result of the light receiving section when the second light source section emits the irradiation light beam and the light reception result of the light receiving section when the reference light source section emits the irradiation reference light beam become equal to each other, and the determination section determines the positional relationship of the object with respect to the first light source section and the second light source section based on the primary first period emission current control information, the secondary first period emission current control information, the primary second period emission current control information, and secondary second period emission current control information.

13. The processing device according to claim 10, wherein the control section performs, in the first period, the emission control of the first light source section and the second light source section so that the light reception result of the light receiving section when the first light source section emits the irradiation light beam and the light reception result of the light receiving section when the second light source section emits the irradiation light beam become equal to each other, and the control section performs, in the second period, the emission control of the first light source section and the second light source section so that the light reception result of the light receiving section when the first light source section emits the irradiation light beam and the light reception result of the light receiving section when the second light source section emits the irradiation light beam become equal to each other.

14. The processing device according to claim 12, wherein assuming that current setting values of the currents respectively flowing through the first light source section and the reference light source section, which correspond to the primary first period emission current control information, are $IA1$ and $IB1$, current setting values of the currents respectively flowing through the second light source section and the reference light source section, which correspond to the secondary first period emission current control information, are $IA2$ and $IB2$, current setting values of the currents respectively flowing through the first light source section and the reference light source section, which correspond to the primary second period emission current control information, are $IA1d$ and $IB1d$, current setting values of the currents respectively flowing through the second light source section and the reference light source section, which correspond to the secondary second period emission current control information, are $IA2d$ and $IB2d$, a value of a first function representing the positional relationship of the object with respect to the first light source section is $FA1$, a value of a second function representing the positional relationship of the object with respect to the second light source section is $FA2$, and a ratio between the value $FA1$ of the first function and the value $FA2$ of the second function is $FR$, the determination section determines the positional relationship of the object with respect to the first light source section and the second light source section by obtaining the ratio $FR$ between the value $FA1$ of the first function and the value $FA2$ of the second function using the following relational expression:

$$FR=(IB2 \times IA1 \times IB1d/IA1d-IB1 \times IB2)/(IB1 \times IA2 \times IB2d/IA2d-IB1 \times IB2).$$

15. The processing device according to claim 13, wherein the control section outputs, in the first period, the first period emission current control information for setting currents respectively flow through the first light source section and the second light source section to the determination section so that the light reception result of the light receiving section when the first light source section emits the irradiation light beam and the light reception result of the light receiving section when the second light source section emits the irradiation light beam become equal to each other, and the control section outputs, in the second period, the second period emission current control information for setting currents respectively flow through the first light source section and the second light source section to the determination section so that the light reception result of the light receiving section when the first light source section emits the irradiation light beam and the light reception result of the light receiving section when the second light source section emits the irradiation light beam become equal to each other, and the determination section determines the positional relationship of the object with respect to the first light source section and the second light source section based on the first period emission current control information and the second period emission current control information.

16. The processing device according to claim 15, wherein assuming that current setting values of the currents respectively flowing through the first light source section and the second light source section, which correspond to the first period emission current control information, are IA1 and IA2, current setting values of the currents respectively flowing through the first light source section and the second light source section, which correspond to the second period emission current control information, are IA1$d$ and IA2$d$, a value of a first function representing the positional relationship of the object with respect to the first light source section is FA1, a value of a second function representing the positional relationship of the object with respect to the second light source section is FA2, and a ratio between the value FA1 of the first function and the value FA2 of the second function is FR, the determination section determines the positional relationship of the object with respect to the first light source section and the second light source section by obtaining the ratio FR between the value FA1 of the first function and the value FA2 of the second function using the following relational expression:

$FR=(IA1 \times IA2d)/(IA2 \times IA1d)$.

\* \* \* \* \*